(12) United States Patent
Tuma et al.

(10) Patent No.: US 7,755,292 B1
(45) Date of Patent: Jul. 13, 2010

(54) ULTRAMINIATURE BROADBAND LIGHT SOURCE AND METHOD OF MANUFACTURING SAME

(75) Inventors: Margaret L. Tuma, Strongsville, OH (US); Joseph S. Collura, Auburn, OH (US); Henry Helvajian, Pasadena, CA (US); Michael D. Pocha, Livermore, CA (US); Glenn A. Meyer, Danville, CA (US); Charles F. McConaghy, Livermore, CA (US); Barry L. Olsen, Oakdale, CA (US); William W Hansen, Lakewood, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 570 days.

(21) Appl. No.: 11/625,545

(22) Filed: Jan. 22, 2007

(51) Int. Cl.
*H01J 17/04* (2006.01)
*H01J 61/04* (2006.01)
(52) U.S. Cl. .................. 313/631; 313/238; 313/573; 313/634
(58) Field of Classification Search .................. 313/631
See application file for complete search history.

(56) References Cited

U.S. PATENT DOCUMENTS

| | | | |
|---|---|---|---|
| 3,604,971 A | 9/1971 | Tracy | |
| 4,563,617 A | 1/1986 | Davidson | |
| 4,760,306 A * | 7/1988 | Leung et al. ............... | 313/341 |
| 5,493,177 A | 2/1996 | Muller | |
| 5,946,083 A | 8/1999 | Melendez | |
| 5,955,839 A | 9/1999 | Jaffe | |
| 5,956,003 A | 9/1999 | Fisher | |
| 5,977,707 A | 11/1999 | Koenig | |

(Continued)

FOREIGN PATENT DOCUMENTS

JP 6068855 3/1994

(Continued)

OTHER PUBLICATIONS

Morgan Advanced Ceramics Material Safety Data Sheet for INCUSIL-ABA, 6 Pages, May 27, 2003.

(Continued)

*Primary Examiner*—Nimeshkumar D Patel
*Assistant Examiner*—Jacob Stern
(74) *Attorney, Agent, or Firm*—Woodling, Krost and Rust; Robert H. Earp, III

(57) ABSTRACT

An ultraminiature light source using a double-spiral shaped tungsten filament includes end contact portions which are separated to allow for radial and length-wise unwinding of the spiral. The double-spiral filament is spaced relatively far apart at the end portions thereof so that contact between portions of the filament upon expansion is avoided. The light source is made by fabricating a double-spiral ultraminiature tungsten filament from tungsten foil and housing the filament in a ceramic package having a reflective bottom and a well wherein the filament is suspended. A vacuum furnace brazing process attaches the filament to contacts of the ceramic package. Finally, a cover with a transparent window is attached onto the top of the ceramic package by solder reflow in a second vacuum furnace process to form a complete hermetically sealed package.

25 Claims, 21 Drawing Sheets

U.S. PATENT DOCUMENTS

| | | | |
|---|---|---|---|
| 6,555,948 | B1 | 4/2003 | Noll |
| 6,796,866 | B2 | 9/2004 | George |
| 6,812,626 | B2 | 11/2004 | Perlo |
| 2003/0041649 | A1* | 3/2003 | George et al. .............. 73/24.02 |
| 2003/0227243 | A1 | 12/2003 | Perlo |
| 2004/0250589 | A1 | 12/2004 | Hogan |
| 2005/0173411 | A1* | 8/2005 | Goto ........................ 219/543 |

FOREIGN PATENT DOCUMENTS

| | | |
|---|---|---|
| JP | 6302304 | 10/1994 |
| JP | 2004158319 | 3/2004 |

OTHER PUBLICATIONS

Kyocera Corporation, Drawing No. PB-C88231, Apr. 29, 1988.

Spectrum Corporation Part No. C-731-21-50MK100MND-GKL Applicant became aware of on Sep. 19, 2006.

Kyocera Corporation Drawing No. PB-C85189, May 14, 1985.

Thermal Analysis of a Mems Broadband Light Source: Test Data and Model, by Eric Golliher, Margare Tuma, Joseph Collura, Eric James and James Yuko, 2003.

Thermal Analysis of Mems Broadban Light Source, Eric Golliher, 2002.

Nasa Mems Broadband Light Source 2002 Annual Report, Version -012, Joe Collura, Sep. 2002.

Mems Incandescent Light Source, Margaret Tuma, Kevin King, Lynn Kim, Richard Hansler, Eric Jones, Thomas George, Proceedings of the SPIE, vol. 4134, 2000.

* cited by examiner

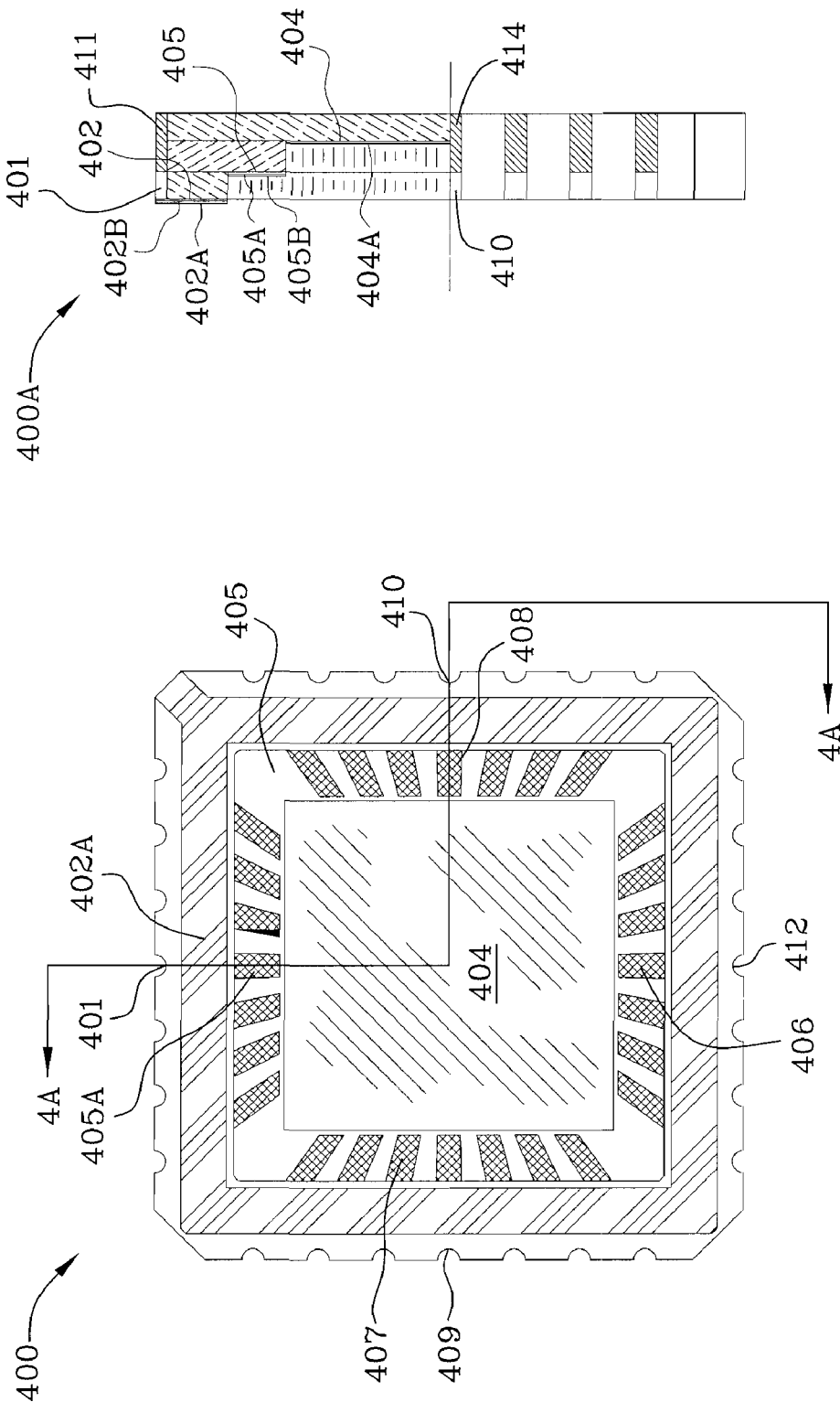

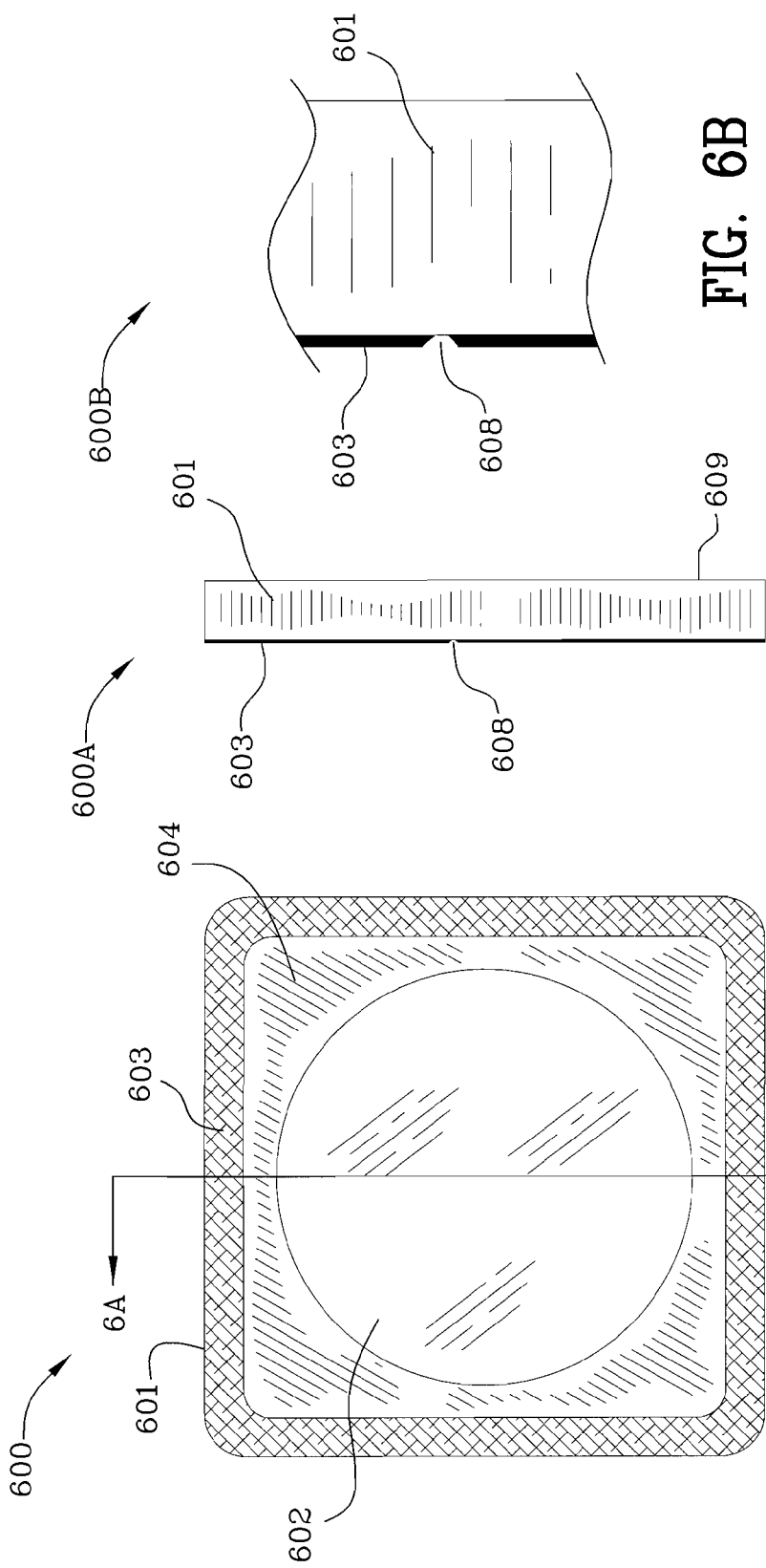

ULTRAMINIATURE BROADBAND LIGHT SOURCE AND METHOD OF MANUFACTURING SAME

ORIGIN OF THE INVENTION

The invention described herein was made by an employee of the United States Government, and may be manufactured and used by the government for government purposes without the payment of any royalties therein and therefor. The invention was made under contract between the United States Government and employees of other entities and as such the United States Government has certain rights in this invention.

FIELD OF THE INVENTION

The invention is in the field of broadband incandescent light sources which may be used for the calibration of spectrometers and for powering optical sensors.

BACKGROUND OF THE INVENTION

The invention is in the field of broadband light sources used to calibrate spectrometers or supply light to other optical instruments for powering them or for other calibration and measurement purposes. Spectrometers are instruments which are used to determine spectral information about objects which indicate to scientists and engineers qualitative and quantitative information about the objects. Light emitting objects (which may include planets and samples from planets) emit light in the form of photons when excited by an energy source. Light in the form of photons is emitted when electrons of an object change states in distinct energy levels according to quantum theory. It is this emission which scientists and engineers sense with a spectrometer to evaluate and correlate measurements of the spectrometer with known spectral information about elements to infer the constituency of the object. The light emitting source or object may be a planet or it may be a sample taken from a planet and analyzed in a laboratory type environment on-board a space ship.

Spectrometers have been known for some time but those in use today are highly specialized and designed to process and measure electromagnetic radiation over a certain band of frequencies. Crude spectrometers can be made at home from cereal boxes with slits in them which admit light in a certain region of the visible spectrum to a compact disk placed at an angle with respect to the incoming light which is then refracted in spectra which can be viewed and used to infer the chemical make-up of the atmosphere. Spectrometers used on board spaceships are very sophisticated instruments and include complex calibratable gratings and electronics to accept and process light from planets and samples from planets in determining the elemental composition of an object. Spectrometers analyze the excitation of objects which have been excited by a light source.

Military use of spectrometers is prevalent to identify discontinuities in the surface of our own planet to infer that which is not normal for a specific location thus identifying weapons and equipment.

Electromagnetic radiation is denoted as such because it includes electric fields and magnetic fields which are propagated by the source of the radiation. The general equation of frequency times wavelength=speed of light governs all electromagnetic radiation such that the higher the frequency the shorter the wavelength and vice versa.

The spectrometers which can be used with the broadband light source of the instant invention are designed to view the entire visible light spectrum.

White light sources are used to calibrate spectrometers in the visible range. It is desirable, therefore, to have an output source which spans past the visible light spectrum. The visible light range includes red, orange, yellow, green, blue, indigo and violet. Some recent commentaries are now indicating that indigo should possibly not be included as a separate color as it is a combination of other colors.

A broadband white light source includes all components of the visible spectrum as demonstrated by early scientists such as Newton wherein white light coming from the sun was broken down into its several components with the use of a prism.

U.S. Pat. No. 6,796,866 which has one inventor in common with the instant application is incorporated herein by reference. FIG. 1 is a schematic 100 of the prior art device illustrated in U.S. Pat. No. 6,796,866. There are three silicon layers 108, 106, 102 disclosed in the '866 patent. The silicon substrate 202 includes a top nitride layer 204, a bottom nitride layer 206, and a cavity 208 which allows for the transmission of light to the window 104. The silicon substrate 106 is a middle filament mount layer having a top nitride layer 214 and a bottom nitride layer 216. The silicon substrate layer 108 includes a reflective top layer 242. The spiral filament 220 is bridged across an aperture 218 in the middle substrate 106. Contacts 220 of the filament communicate with electrical leads 222 which in turn communicate with wire bond pad 210 and wire bond lead 240.

The '866 patent discloses a MEMS based package which employs Ti/Pt/Au bonding rings 230, 232, 250, 252 to bond the bottom layer 108 to the middle layer 106 and the middle layer 106 to the top layer 102. The bonding rings are deposited on the Si semiconductors in a facing relationship. Insulation 234 is interposed between the nitride 214 and the contact pads 232 to prevent electrical shorting between electrical leads 222 and conductive bonding rings 232.

The bottom layer 108, the middle layer 106 (silicon substrate 212), and the top layer 102 are bonded together. The reflective surface 242 contributes to the radiation of light through transmission window 104 in the top nitride layer 204 of the top layer 102.

FIG. 2 is a schematic 200 of the prior art device illustrated in U.S. Pat. No. 6,796,866. The end contact portions 220 are connected to electrical leads 222, 236 according to the specification of the '866 patent. It will be noticed that the spacing between the double-spirals is constant between the end portions 220 and an intermediate portion 291 all the way to the central portion 292. The language of a double-spiral, intermediate portion 291 and the central portion 292 does not appear in the '866 patent and are not extracted therefrom. It has been discovered that when the filament of the '866 patent is heated from the joule heating caused by the flow of current therethrough, the filament 200 expands radially and it also expands lengthwise.

Actual mechanical and electrical contact may result in partial shorting of a portion of a turn of the spiral. If the turns are too close together this can happen due to some distortion of the spiral during operation or due to vibration. In an earlier design in which the space between turns was everywhere constant, the shorting tended to occur near the outer part of the spiral where distortion appeared to be most severe.

The filament has constant thickness. The width of the filament varies along its length as wider tabs (end contacts) and less wide outer windings and still less wide inner windings. The thermal expansion of the material differs based on joule heating which varies with the voltage applied and with the resistance (determined by cross-sectional area) of the particular part of the filament. The end contacts of the filament are wider than the windings of the filament so the end contacts or tabs have a larger cross-sectional area than the windings and so have a lower resistance than the windings and so have less joule heating for a particular operating voltage than the windings. Since both the end contacts and outer windings are wider than the inner windings, both the end contacts and outer windings run cooler than the inner windings for a particular operating voltage. The cooler metal expands less and is less flexible than the warmer inner windings. The inner windings expand along their length, following the curve out. As the inner windings tend to de-coil or unwind, their length increases and they may eventually collide with the more stationary cooler outer windings producing an electrical short path.

FIG. 2A is a schematic 200A of the prior art device illustrated in U.S. Pat. No. 6,796,866 with the tungsten coil thereof illustrated in the process of unwinding. Reference numerals 260A, 261A, 262A and 263A indicate the general location where the first and second spirals interengage each other upon heating thereof. In FIG. 2, reference numerals 260, 261, 262, and 263 indicate gaps between the windings of the spirals. When the first and second spirals are heated they expand and engage as indicated by reference numerals 260A, 261A, 262A and 263A as illustrated in FIG. 2A.

The shortened path then has lower resistance and draws even more current which increases the evaporation rate of the filament which decreases the lifetime because the filament narrows further until it gets to a point where it melts and opens the circuit creating an open circuit path.

Although the light source of the '866 patent is a very efficient broadband light source its assembly is somewhat complicated and involves the deposition of the Ti/Pt/Au bonding rings on the top, middle and bottom layers and subsequent processing under vacuum or in an inert atmosphere at or near atmospheric pressure in a thermal compression binder to assemble the device together.

U.S. Pat. No. 5,977,707 to Koenig discloses a planar spiral made from tungsten as illustrated in FIG. 7 thereof but the remaining claimed structure and processes are not found or suggested by the reference.

U.S. Pat. No. 3,604,971 to Tracy discloses a filament mounting structure for a display device which includes a plurality of helical filaments to form a display but fails to disclose a single planar double spiral as claimed.

Therefore, it is desirable to have an ultraminiature light source which does not short-out due to thermal expansion and vibrations of the filament and which is efficiently packaged.

SUMMARY OF THE INVENTION

An ultraminiature light source comprises a ceramic base and a generally planar double-spiral shaped tungsten filament suspended within the ceramic base. The ceramic base may be a glass or glass ceramic. A lid which is partially transparent is placed over the ceramic base. The lid may also be coated with dielectric material to selectively transfer specific radiation bands that are selective to the application. The ceramic enclosure or base includes a reflective bottom, a ledge, and a raised perimeter having a metallic surface. The ledge includes metallic surfaces embedded therein for electrical communication with the double-spiral shaped tungsten filament. The double-spiral shaped tungsten filament comprises first and second interleaved concentric spiral portions radially converging with decreasing radius and centrally joined together in a central portion. Each of the first and second spiral portions of the double-spiral shaped tungsten filament includes an end contact portion, an intermediate portion and a central portion. A feature of the aforesaid design double spiral shaped filament is that upon joule heating it lengthens and this physical feature can be used to place the filament in compression against an end stop for additional vibrational damping.

A first gap defined between the first and second spiral portions of the dual-spiral shaped tungsten filament and a second gap defined between the second and first spiral portions of the dual-spiral shaped tungsten filament. The first spiral portion being wound, for example, in a clockwise direction and the second spiral portion being wound in a clockwise direction with said first gap defined between the first and second spirals. The second gap defined between the second and first spiral portions being substantially constant between the intermediate portions of the spiral portions. The first gap between the end contact portion of the first spiral portion and the second spiral portion being relatively larger than the first gap between the intermediate portions of the first and second spiral portions.

The second gap between the end contact portion of the second spiral and the first spiral portion being relatively larger than the second gap between the intermediate portions of the second and first spiral portions. The first and second gaps near and at the central portion being relatively smaller than the gaps between the intermediate portions of the spiral portions of the double-spiral shaped filament. The end contacts of the first and second spiral portions may be brazed or affixed by other means to the metal surfaces of the ledge of the ceramic enclosure such that the double-spiral shaped tungsten filament is suspended above the reflective base. The transparent portion of the lid is soldered to the metal surfaces of the ceramic bases and forms a chamber within which the double-spiral shaped tungsten filament resides and is suspended therein. The chamber being substantially at a desired vacuum or filled with non-reactive gas for a desired specific photochemical action.

The process for making an ultraminiature light source is disclosed and claimed. The steps include fabricating a double-spiral ultraminiature tungsten filament from tungsten foil. Braze preform is placed over two metal contacts of a suitable chip carrier package. End contacts of the tungsten filament are positioned so as to bring them into engagement with the braze preform covering the contacts of the chip carrier package. The chip carrier package is placed with the filament positioned therein into a vacuum furnace. Preferably, the chip carrier package has a base plated with a material selected from the group of reflective refractory metal, refractory ceramic carbide, boride, and nitride. The chip carrier package is heated to approximately 800° C. under a desired vacuum and the tungsten filament is bonded to the chip carrier package by the braze preform. The chip carrier package, the tungsten filament, and the brazing are then cooled while the pressure is increased to atmospheric pressure. A solder preform is applied to the perimeter of the lid which has a transparent portion. The solder preform is nicked to create a discontinuity therein.

The lid has a solder preform which is tack welded over the perimeter of the lid. The solder preform of the lid is then applied over the perimeter of the chip carrier package. The chip carrier package includes an upper lip or perimeter which has a gold plating which resides over a nickel plating which interengages the solder preform. The lid with said solder affixed thereto is brought forcibly into engaging contact with the chip carrier package and placed into the furnace under a desired vacuum. The chip package is then heated under the desired vacuum to the eutectic temperature of the solder to remelt and reflow the solder to seal the chip carrier package under the desired vacuum. The chip carrier is then cooled to room temperature and restored to atmospheric pressure.

The ceramic chip carrier of the instant invention as described below includes a stepped profile in cross-section. The bottom of the ceramic chip carrier includes a gold plated surface which may be polished. The first step of the profile includes contacts over which the ultraminiature dual spiral filament is bridged.

The '866 patent reference does not teach or disclose an ultraminiature dual spiral having divergent end contact portions which are brazed to a pair of contacts within the ceramic chip carrier. Nor does the '866 patent teach or disclose the use of a ceramic chip carrier in combination with a commercially available lid. Nor does the '866 patent teach or disclose the claimed process steps.

Nor does the structure of the '866 patent prohibit shorting of the spirals upon thermal expansion or because of vibration.

The invention also discloses structure for using the light emitted from the dual spiraled tungsten filament. Specifically, an ultraminiature light conducting package comprises a dual spiraled tungsten filament having a substantially constant thickness and a carrier package having a transparent window. The dual spiraled tungsten filament is suspended within the package. A fiber optic light guide is affixed to the transparent window of the package.

Accordingly, it is an object of the invention to provide an ultraminiature light source which is efficiently coupled to a fiber optic guide.

Accordingly, it is an object of the invention to provide an ultraminiature light source which includes a double-spiral filament with divergent end contact portions.

Accordingly, it is an object of the invention to provide an ultraminiature light source which includes a double-spiral filament having wide end contacts which neck down to a reduced-width transitional portion which then gradually reduce down in width in the shape of a wide sweeping and tapering arc to a width maintained by the inner windings which terminate in a central portion.

Accordingly, it is an object of the invention to provide an ultraminiature light source in a chip carrier package which includes a ceramic base and a partially transparent lid.

Accordingly, it is an object of the invention to provide an ultraminiature light source whose filament maintains its integrity despite vibration and heating.

Accordingly, it is an object of the invention to provide an ultraminiature light source whose filament does not short between portions thereof due to thermal expansion of the tungsten, tungsten alloy or other filament material.

Accordingly, it is an object of the invention to use a commercially available package and lid in combination with a new process and new filament disclosed herein which is advantageous insofar as sealing of the package, simplicity of construction, ruggedness, durability and cost are concerned.

These and other objects will be best understood when reference is made to the Brief Description of the Drawings, Description of the Invention and Claims which follow hereinbelow.

BRIEF DESCRIPTION OF THE DRAWINGS

FIG. 4 is an illustration of the ceramic base illustrating a reflective bottom, a ledge having contact pairs which engages the end contact portions of the spiral, and an upper perimeter or lip which is coated with metal.

FIG. 4A is a quarter-sectional view of the ceramic base illustrating the reflective bottom portion, the ledge and the upper perimeter or lip.

FIG. 6 is a view of the bottom side of the lid illustrating the transparent window and the lip which mates with the upper surface of the ceramic base.

FIG. 6A is a side view of the lid.

FIG. 6B is an enlarged portion of FIG. 6A illustrating a nick in the solder preform.

The drawings will be best understood when reference is made to the Description of the Invention and Claims which follow hereinbelow.

DESCRIPTION OF THE INVENTION

Figure 3:
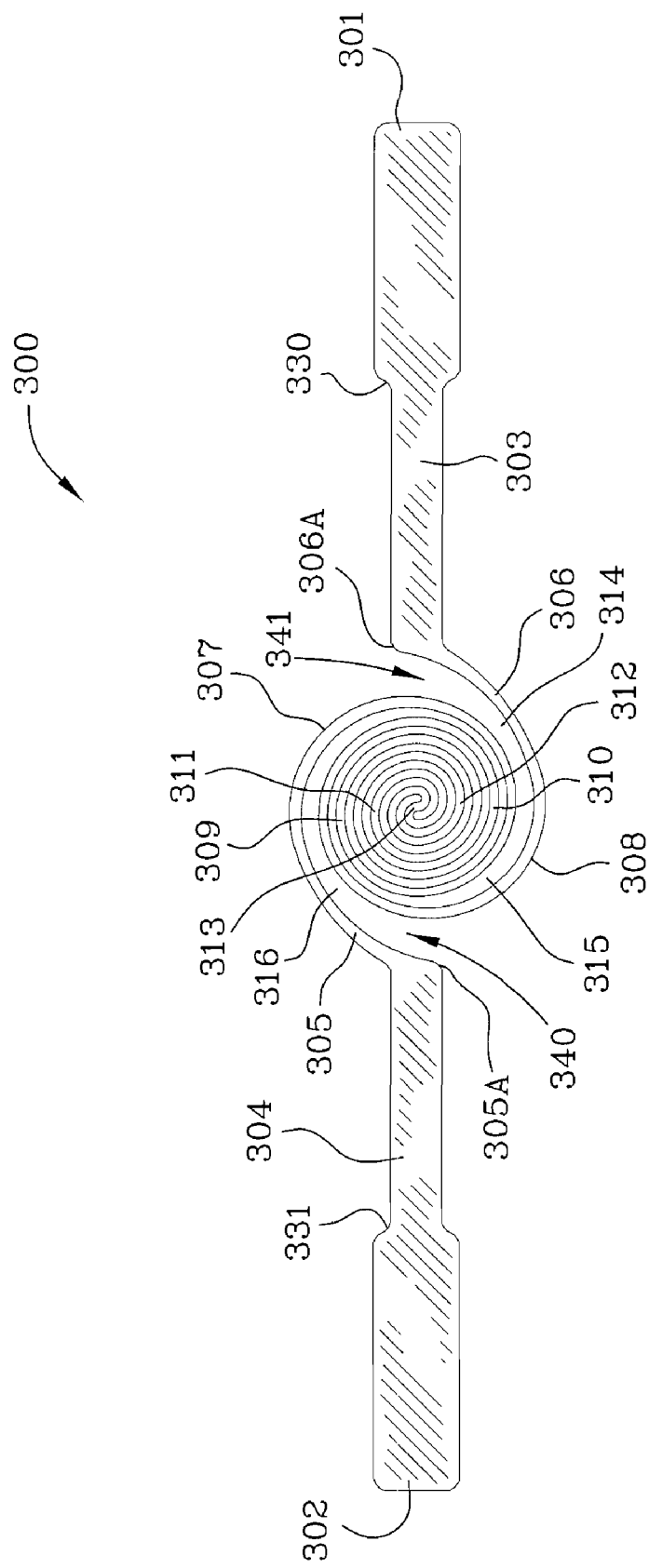
FIG. 3 is an illustration of the double-spiral filament of the instant invention having end contact portions which are divergent from the next adjacent spiral.

FIG. 3 is an illustration of the double-spiral element 300 of the instant invention having end contact portions 301, 302 which are divergent from the next adjacent spiral. By increasing the radius of the outer windings of the double-spiral, the inner windings are allowed to decoil while not contacting the outer windings or tabs so that the short path is less likely for a particular operating voltage. The net result is to allow more stable light output for a longer lifetime at a higher operating point for the filament.

Figure 7:
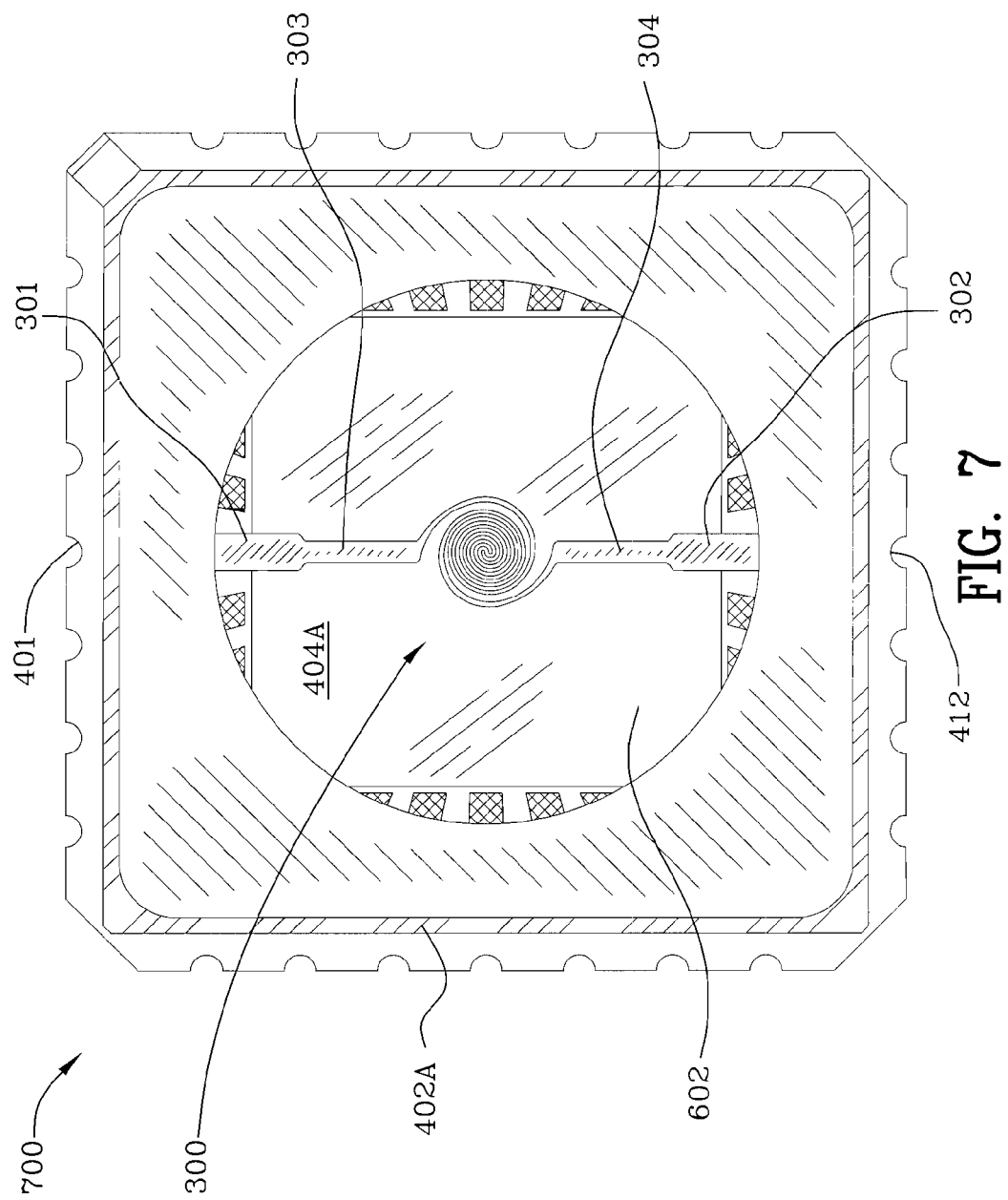
FIG. 7 is a top view of the ultraminiature light source assembled.

End contact portions 301, 302 of the double-spiral filament contact ledge 405 of leadless chip carrier package 400 and are in electrical communication therewith. See, FIGS. 4 and 4A, which generally represent a commercially available leadless chip carrier package such as the one illustrated and made by Kyocera Corporation of Kyoto, Japan, Kyocera Drawing Number PB-C88231-JMI. It will be noted that the leadless chip carrier package includes a plurality of gold contacts which are embedded in or deposited on the surface of the ledge. Any oppositely oriented pair of contacts may be used as they will position the double-spiral filament centrally within the chip carrier package. The double-spiral filament 300 is centrally mounted as this will maximize the light output through a correspondingly oriented window 602 in a lid 600 as illustrated in FIGS. 6 and 7.

A braze preform available from Morgan Ceramics/Wesgo Metals Incusil-ABA having 59% Ag, 27.25% Cu, 12.5% In and 1.25% Ti having a liquidus temp=715° C. covers the contacts of the leadless chip carrier. The leadless chip carrier with the filament engaging the braze preform and the contacts are then heated under a desired vacuum at approximately 800° C. until the filament is secured in place.

A transitional portion 303 of the filament interconnects end contact portion 301 and outer spiral portion 306 of the first spiral and a transitional portion 304 interconnects the end contact portion 302 and outer spiral portion 305 of the second spiral. It will be noticed that the end contact portions 301 and 302 are significantly larger in cross-sectional area than the transitional portions 303, 304. The filament is 0.025 mm (25 μm) thick everywhere and the end contacts are approximately 0.50 mm (500 μm) wide as represented by reference numeral 354 in FIG. 3A. Also see, FIG. 3C, reference numeral 388, illustrating the thickness 388 of the filament. Shoulders 330, 331 reduce the width of the end contact portions to the width of the transition portions 303, 304.

Figure 3A:
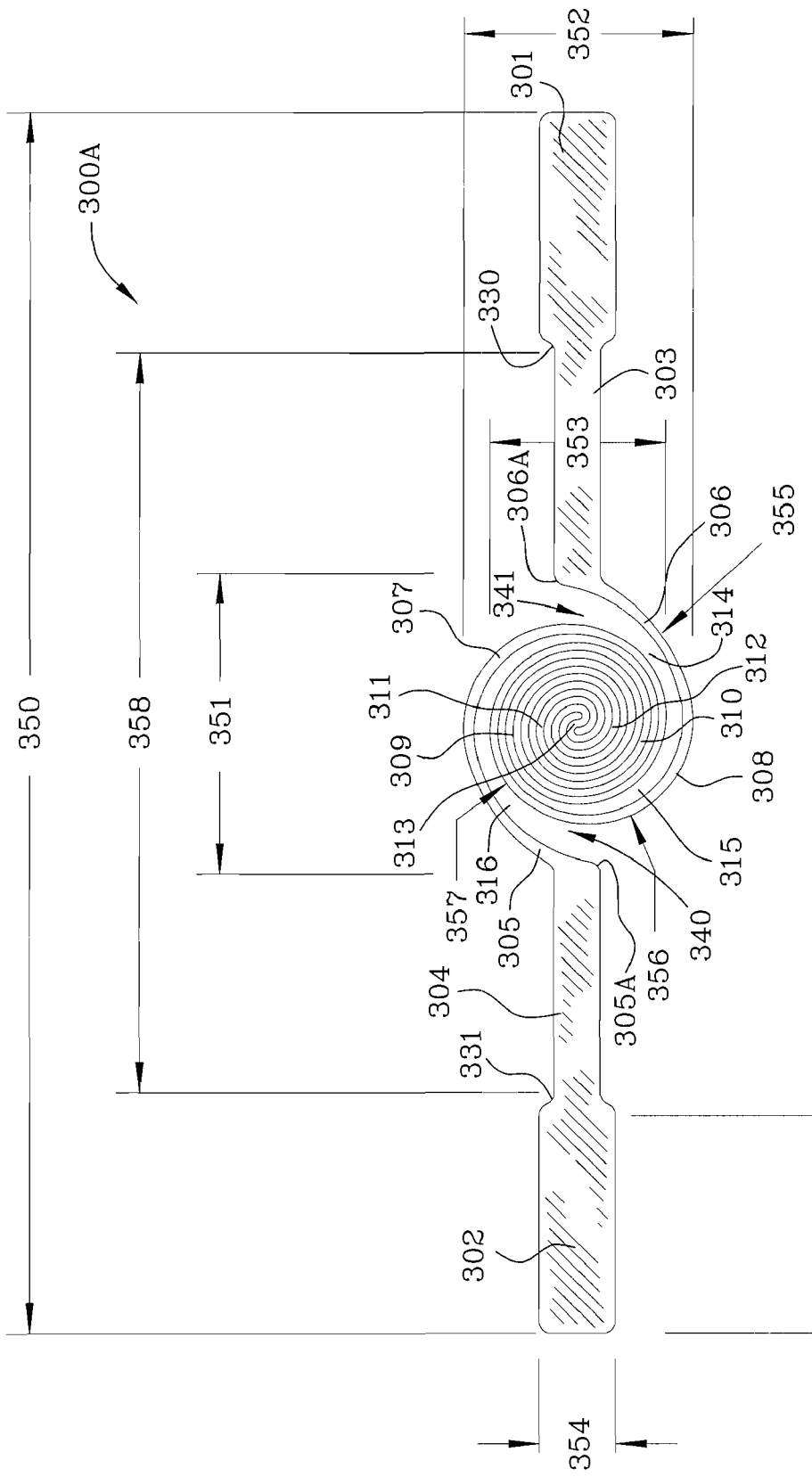
FIG. 3A is an illustration of the double-spiral filament of the instant invention similar to FIG. 3 with additional reference numerals employed to indicate dimensions and radii of the filament.

FIG. 3A is an illustration 300A of the double-spiral filament 300 of the instant invention similar to FIG. 3 with additional reference numerals employed to indicate dimensions and radii of the filament.

Referring still to FIG. 3, the beginning 305A of the outer-most winding 307 of the second spiral 305 is illustrated. Reference numeral 307 represents the outer-most winding of the second spiral. Reference numeral 305A represents the beginning of the outer-most winding 307 of the second spiral 305. Reference numeral 306A represents the beginning of the outer-most winding 308 of the first spiral 306. Reference numeral 308 represents the outer-most winding of the first spiral 308.

Figure 1:
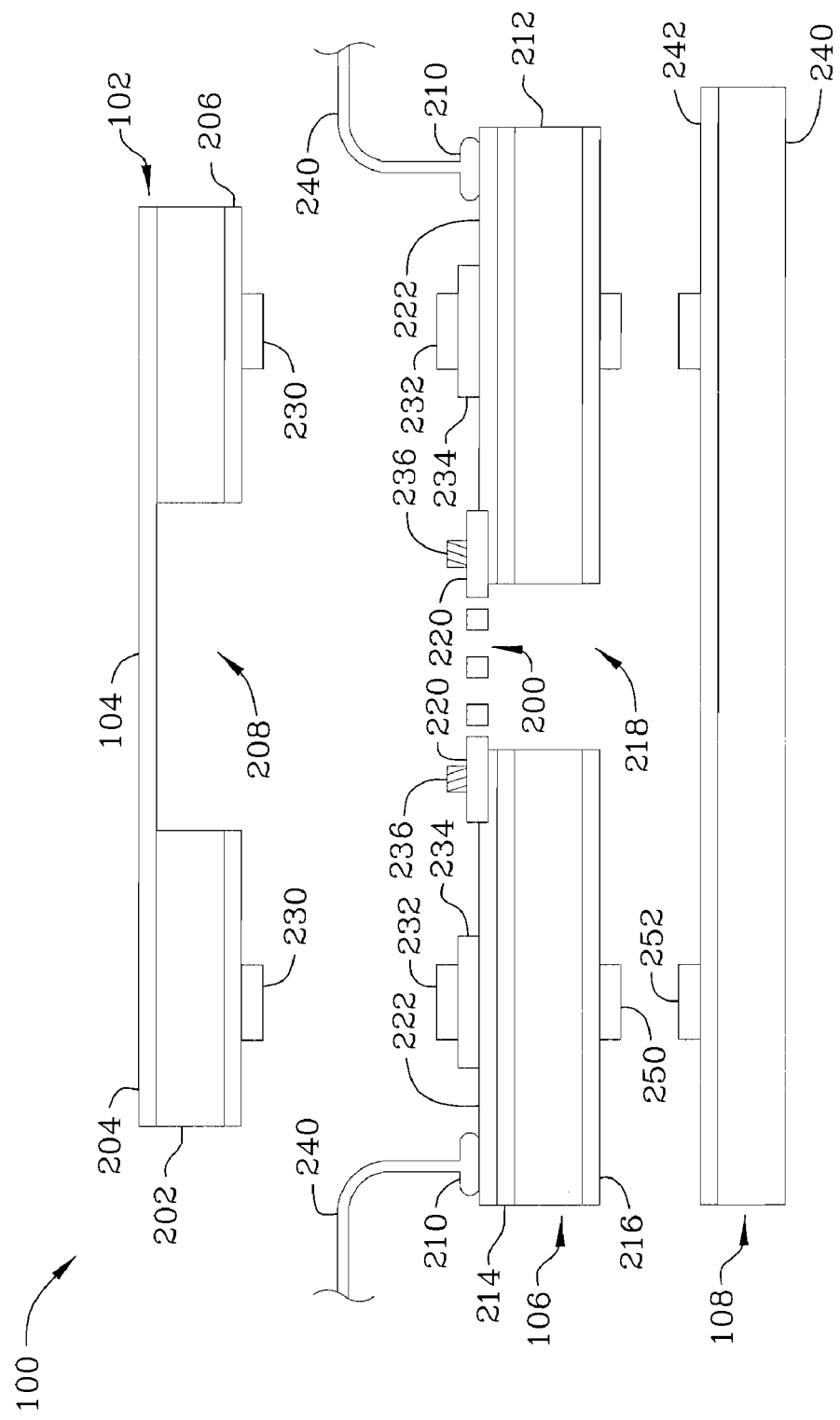
FIG. 1 is a schematic of the prior art device illustrated in U.S. Pat. No. 6,796,866.
Figure 2:
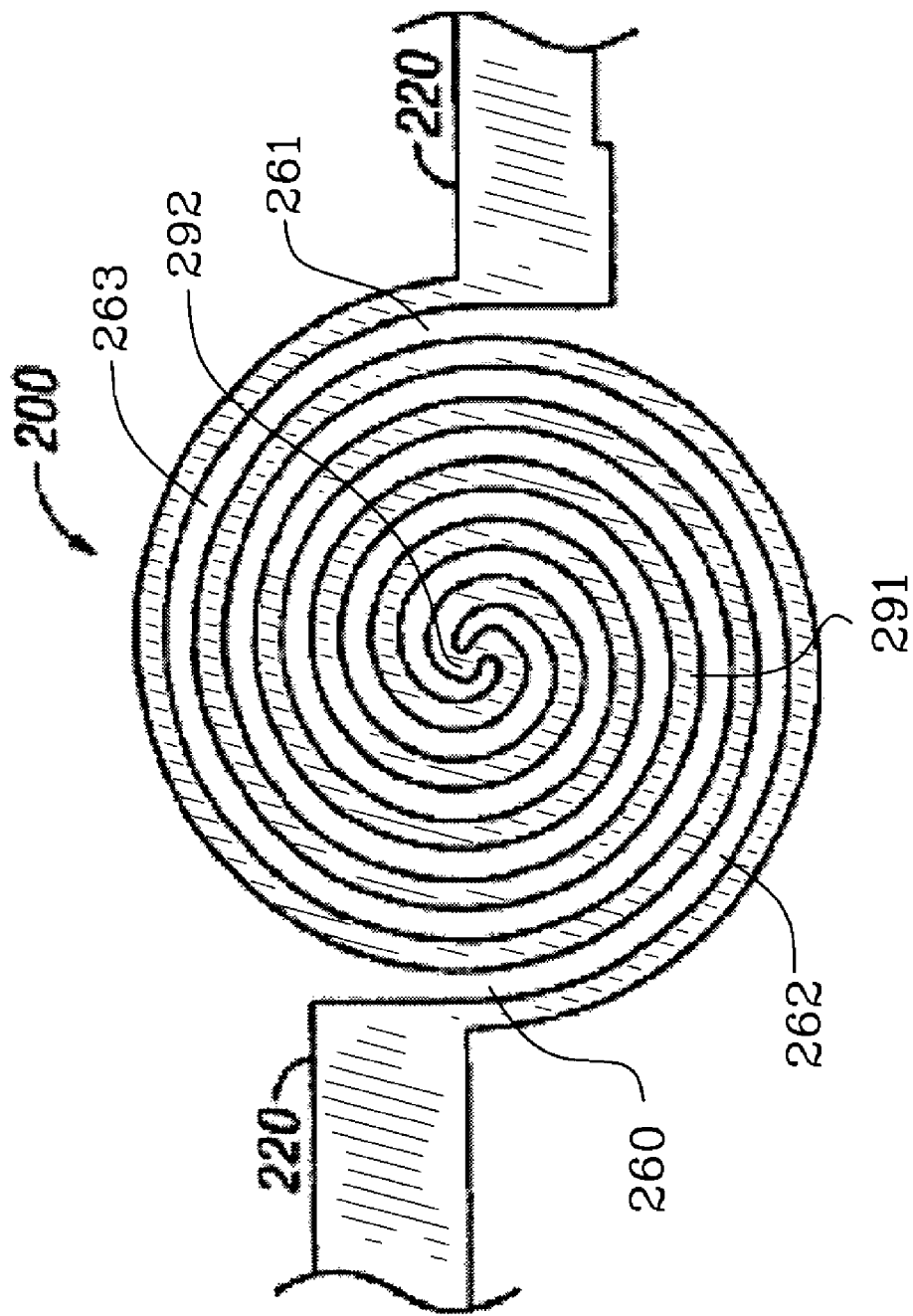
FIG. 2 is a schematic of the prior art device illustrated in U.S. Pat. No. 6,796,866.
Figure 2A:
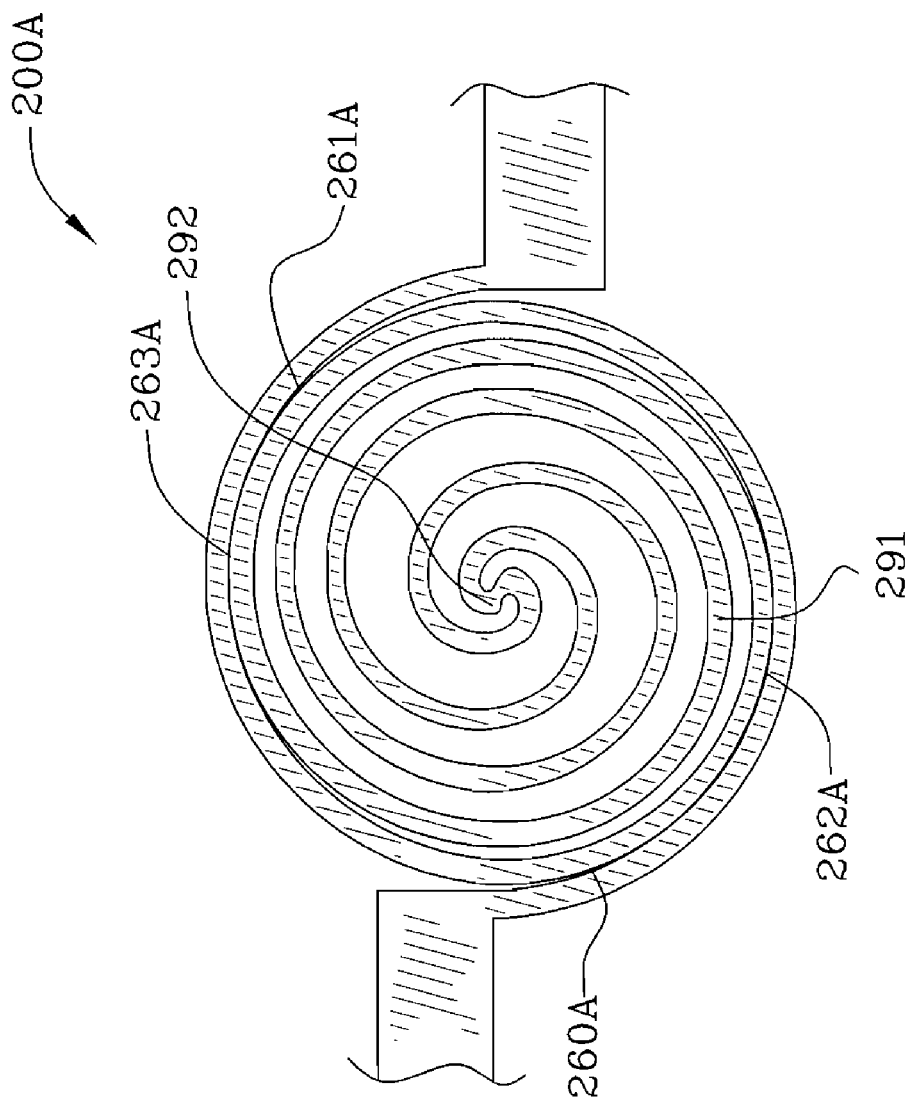
FIG. 2A is a schematic of the prior art device illustrated in U.S. Pat. No. 6,796,866 with the tungsten coil thereof illustrated in the process of unwinding.

Arrow 340 is indicated in FIG. 3 as pointing to the gap 316 (sometimes referred herein as "the second gap") between second spiral 305 and first spiral 306 and arrow 341 is pointing toward the beginning of the gap 314 (sometimes referred herein as "the first gap") between first spiral 306 and second spiral 305. These arrows signify the relatively large gaps at the entrances to the interleaved first 306 and second spiral 305. FIG. 3D illustrates the gaps 314, 316 of the filament after energization (i.e., after the application of appropriate voltage across the end contacts 301, 302) of the tungsten or tungsten alloy filament. The inner windings as discussed hereinbelow are expanded radially outward and lengthened slightly. The filament, as illustrated in FIG. 3, accommodates the joule heating of the filament such that the unwanted contact in the region, defined generally by reference numerals 260, 261, 262 and 263 in FIG. 2A, is avoided and does not occur. Referring to FIG. 3D, the fill factor may change with joule heating, but the filament should unspool evenly so the fill factor should remain mostly the same even though the output disk should grow or shrink as the filament heats or cools.

Referring to FIGS. 3-3D, fill factors for the filament disclosed herein will vary depending on desired temperature of the particular filament used; however, the filament illustrated in FIG. 3 is 25 μm thick (reference numeral 388, FIG. 3C) everywhere, has a 50% fill factor using a 50 μm spacing between spirals 305, 306, and has a 50 μm winding width. The filament of FIG. 3 operates at approximately 2200° K. for 1000 hours. The importance of the fill factor or aspect ratio has to do with the fact that the closer the windings are together the more light you can output per unit area. The spacing is determined by the amount that the filament expands due to thermal effects during operation.

Still referring to FIGS. 3-3D, the inner windings are approximately about the same cross-section, and are the smallest in cross-sectional area of the filament components. This makes the hot spot of the filament generally in the middle (central portion 313) of the filament away from the walls of the package. Since the light comes from the middle of the package it can be easily coupled to the optical fiber attached to the window of the light source.

Still referring to FIGS. 3-3D, the outer windings are tapered like a sickle as a transition from the strong end contacts 301/303 and 302/304 to the inner windings of the interleaved spirals 305, 306. The outer windings 305, 306 are shaped like a sickle with the arc being fairly wide and sturdy to provide a strong gradual transition to the inner windings instead of going right from the end contacts directly to a narrow winding as does the structure of FIGS. 2 and 2A. The arc supports the inner windings encouraging them to uncoil as they heat instead of just twisting off in a torquing motion at the end contact connection point. The arc distributes the stress during temperature changes and thus increases the service life. The arc also provides for the inner windings of the coil to grow outwardly. The end contacts have the greatest cross-section of the filament. In this way the end contacts create a stable base for damping filament vibration and have a lot of adhesion surface area to bind the filament to the leadless chip carrier package. The large end contact portions also provide a relatively large place to handle the filament during the assembly process.

Still referring to FIGS. 3-3D, the narrower inner windings (intermediate windings 309, 310, 311, 312) have the same current as the end contact portions because the current is the same throughout all portions of the filament. The narrower inner windings have the same thickness as the end contact portions 301, 302 and as the inner windings' cross-sectional area is smaller (than the arc, transition portions and end contacts) their relative resistance per incremental unit length is relatively higher and they joule heat more since the same current is squeezed through essentially a smaller volume which means the same number of electrons per second interact with fewer atoms generating more photons and different energy photons than are generated at the end contact portions.

Still referring to FIGS. 3-3D, having the arc and designing the filament such that the outer windings are spaced apart from the inner windings (intermediate windings 309, 310, 311, 312) may decrease the fill factor somewhat but most of the light is from the inner windings so the optical fiber will couple effectively to the filament. In this arrangement the fill factor is about 50%. Filaments having fill factors greater than 50% may be used. The inner windings are approximately 50 μm wide and are spaced apart approximately 50 μm from winding to winding.

The second spiral 305 includes intermediate winding portions 309, 311 which terminate in a central portion 313 which joins second and first spirals 305, 306 together. The first spiral includes intermediate winding portions 310, 312 which also terminate in the central portion 313. Generally the windings of the spirals 305, 306 are widest at the arc which comprises outer-most winding and gradually tapers to the width of the inner winding which is approximately 50 μm.

Referring to FIG. 3A, the overall length 350 of the filament is approximately 8 mm (8000 μm). The radii 355 of the outer-most windings 307, 308 of the second and first spirals 305, 306, respectively, are approximately 0.89 mm (890 μm). The radii 356 of the outer-most windings 307, 308 of both spirals 306, 305 are reduced gradually to approximately 0.68 mm (680 μm) through an arc of about 90° and the radii 357 are further reduced to 0.58 mm (580 μm) through an arc of 180°. Thereafter, the radii are further reduced.

The approximate length 351 between transition portions 303, 304 is 4.84 mm (4840 μm) for the example illustrated in FIG. 3A. The outer diameter 352 of the filament is approximately 1.50 mm (1,500 μm) and is also illustrated in FIG. 3A. The diameter 353 of the tungsten or tungsten alloy filament is approximately 1.15 mm (1,150 μm) at the point where the outer-most windings have swept an arc of approximately 180° from the entrance. The filament employs end contact portions 301, 302 which are then reduced in cross-section in transition portions 303, 304. The distance 358 between the contact portions (i.e., where they are reduced by shoulders 330, 331 to become transition portions 303, 304) is approximately 4.84 mm (4,840 μm). The contact end portions are 1.43 mm (1,430 μm) in length as indicated by reference numeral 359.

The invention is disclosed herein by way of example only and those skilled in the art will readily recognize after reading the specification that many of the dimensions stated herein may be changed without departing from the spirit and scope of the claimed invention.

Figure 3B:
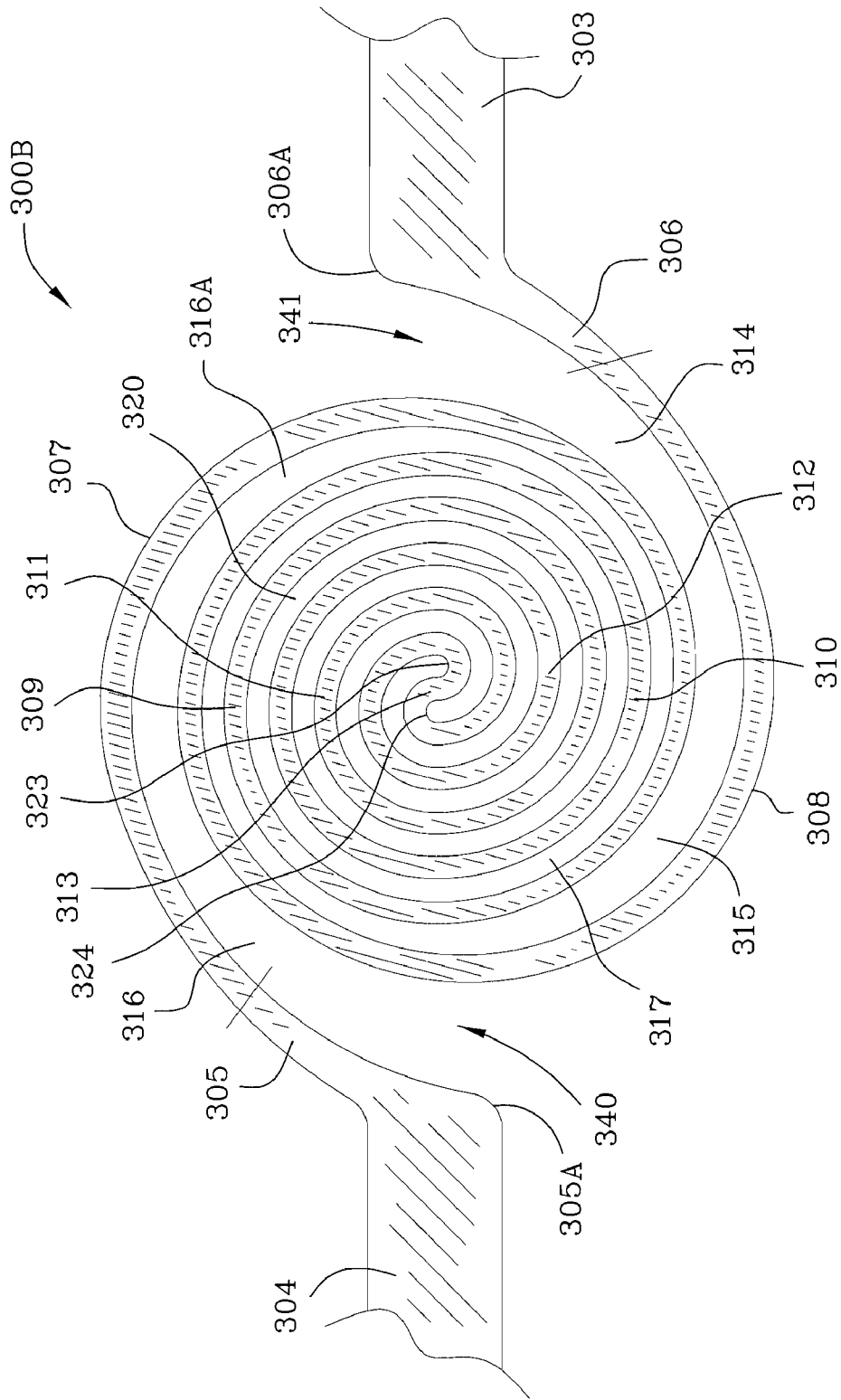
FIG. 3B is an enlargement of a portion of the double-spiral filament illustrated in FIG. 3A.

FIG. 3B is an enlargement 300B of a portion of the double-spiral filament illustrated in FIG. 3A. Reference numeral 314 represents the first gap between the first spiral 306 and the second spiral 305 at the beginning of the outer-most winding 308. Reference numeral 315 represents the first gap between the first spiral 306 and the second spiral 305 after an arc of about 90° of the outer-most winding 308. Reference numeral 317 represents the first gap between intermediate portions of the first spiral 306 and the second spiral 305. Reference numeral 323 represents the termination of the first gap between the intermediate portions of the first and second spirals. The gap terminates where the spirals are joined as indicated by reference numeral 313.

Still referring to FIG. 3B, second gap 320 between intermediate portions of the second 305 and first 306 spirals is illustrated and that second gap which began as 316, 316A terminates as indicated by reference numeral 324.

Figure 3C:
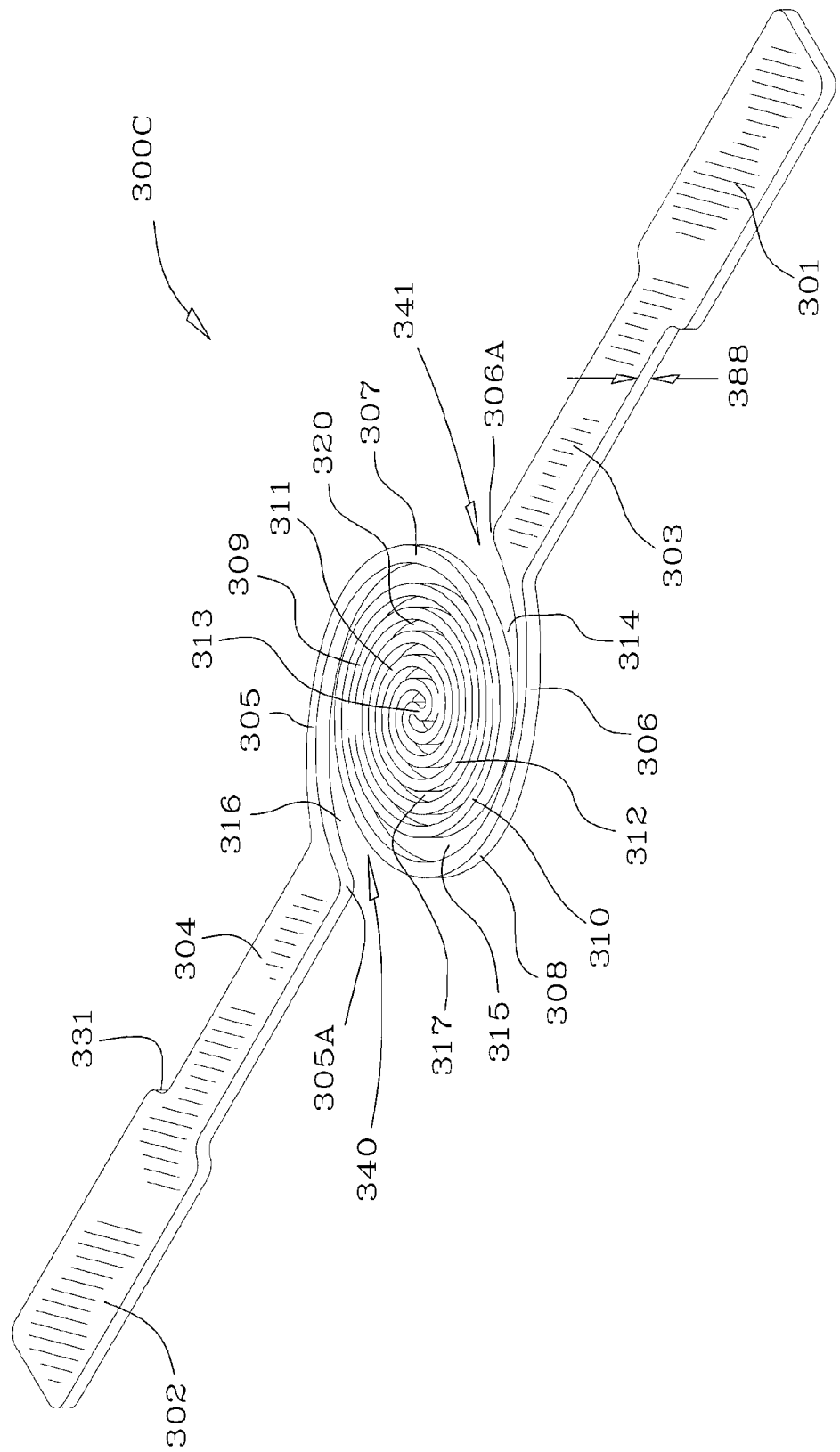
FIG. 3C is a perspective view of the double-spiral filament illustrated in FIG. 3.
Figure 3D:
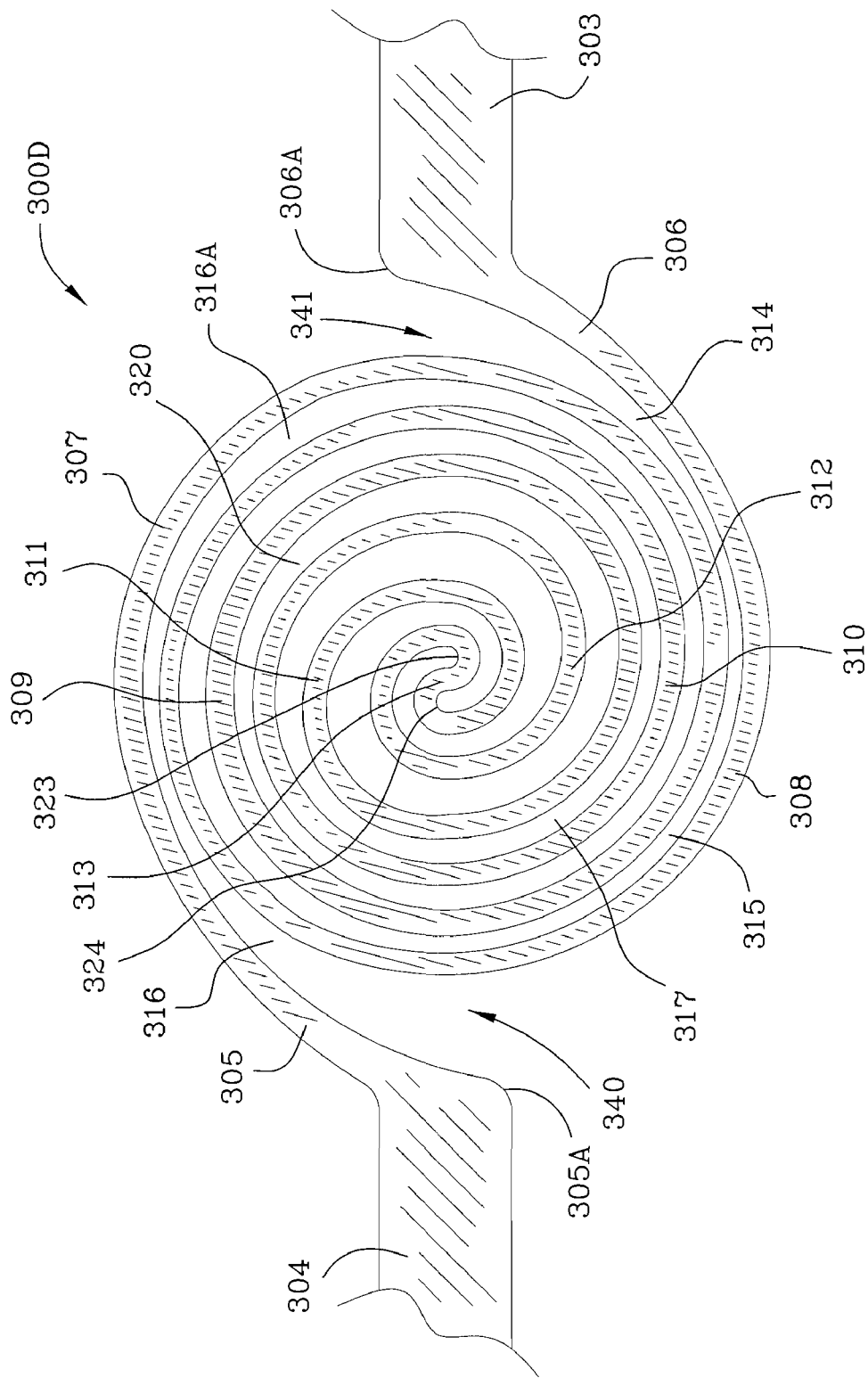
FIG. 3D is an illustration of the double-spiral filament of the instant invention similar to FIG. 3 after the filament has been energized and thermal expansion of the filament has taken place.

FIG. 3C is a perspective view 300C of the double-spiral filament illustrated in FIG. 3 and which illustrates the thickness 388 of 0.025 mm (25 μm) and the generally planar form of the filament which is generally represented by the reference numeral 300 in FIG. 3. In the future it is contemplated that a thickness of 0.050 (50 μm) may be used.

FIG. 4 is an illustration of the ceramic housing or base 400 illustrating a bottom 400, a ledge 405 having contact pairs 405A, 406 which engage the end contact portions 301, 302 of the spiral filament 300, and an upper perimeter or lip 402 which is metal coated 402B, 402A.

The ceramic housing has a metallized upper lip 402A consisting of a base coating of nickel plating 402B with a top coating of 0.0015 mm (1.5 μm) of gold plating 402A.

The bottom 404 of the housing may be polished. Alternatively, a reflective refractory metal, refractory ceramic carbide, boride, or nitride 404A may be deposited on the bottom 404. The bottom reflector layer provides a reflective surface 404A to improve transmission through the transmission window 602 above, see FIG. 7. Alternatively, the bottom reflector layer may include a reflective metal layer 404A which may be a Ti 200 Å/Pt 1000 Å reflective film. Silver may also be used as a reflective material.

Still referring to FIG. 4, grooves 401, 412, 409, 410, are cut vertically into the sides of the leadless chip carrier 400 to allow for interconnections directly to metal contacts 411, 414 within the grooves from outside the leadless chip carrier. Metal contact 405A is in electrical communication (not shown) with contact 411 within the leadless chip carrier 400. Similarly metal contact 408 is in electrical communication (not shown) with contact 414 within the leadless chip carrier 400.

Contact pairs 407, 408 and 406, 405A are the preferred contacts over which braze preform is placed prior to placing end contact portions 301, 302 therein for heating to secure the filament within. Any of the contact pairs may be used as they all result in the centering of the filament within the housing and for its alignment with the window in the lid.

FIG. 4A is a quarter-sectional view 400A of the ceramic base or housing 400 illustrating the reflective bottom portion 404A, the ledge 405 and the upper perimeter or lip 402. FIG. 4A provides a good illustration of outer surface contacts 411, 414 for interconnection to outside devices.

Figure 4B:
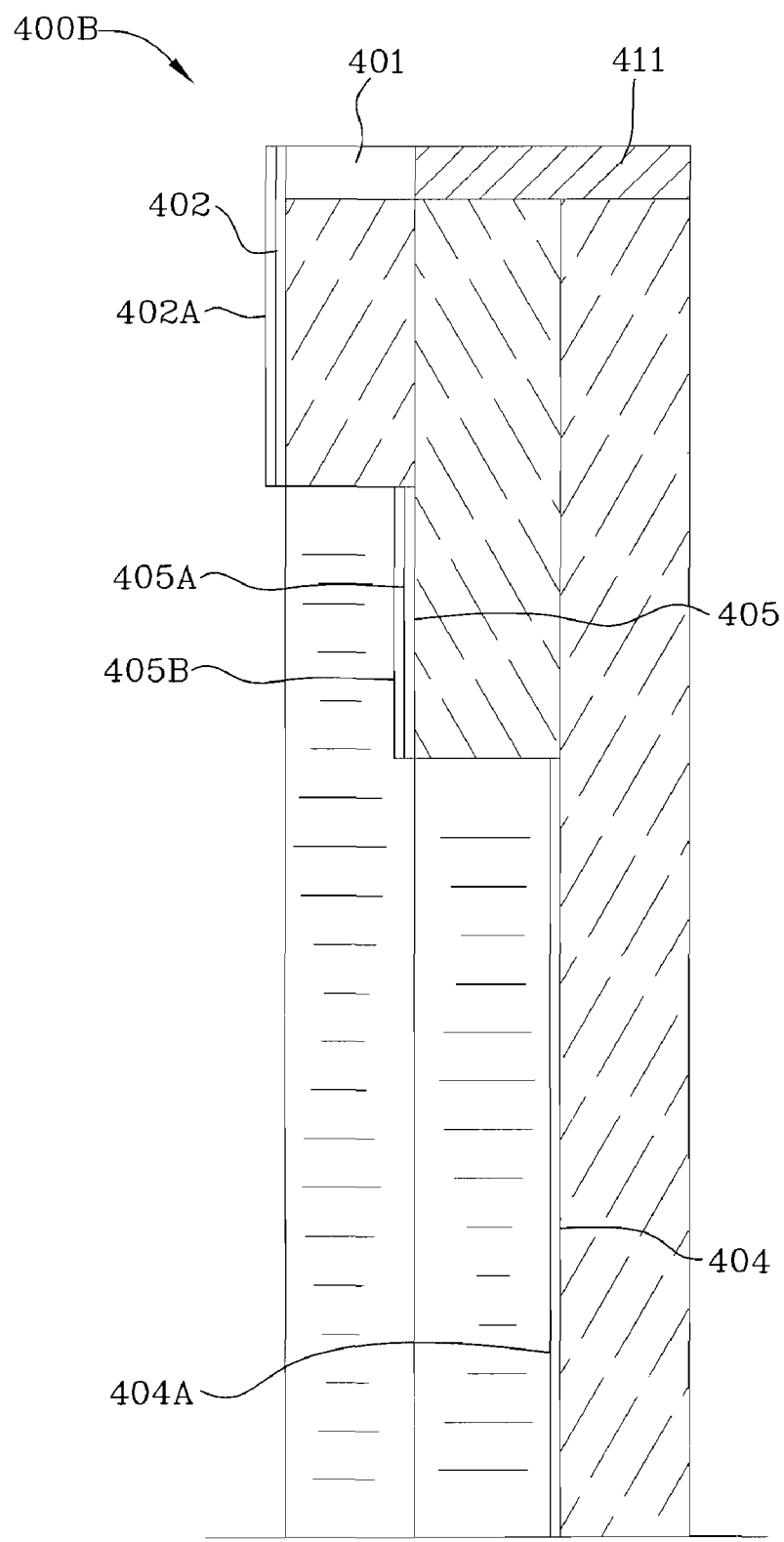
FIG. 4B is an enlarged quarter-sectional view of the ceramic base or housing illustrating the reflective layer covering the bottom of the leadless chip carrier, the nickel plating on the perimeter and the gold plating on the nickel plating.

FIG. 4B is an enlarged portion 400B of the quarter-sectional view 400A of the ceramic base or housing illustrating the reflective layer 404A covering the bottom of the leadless chip carrier, the nickel plating 402B on the perimeter and the gold plating 402A on the nickel plating 402B. Reference numeral 405B indicates a braze preform on top of contact 405A in which end contact 301, 302 may be placed. The end contacts of the tungsten filament may be bonded to contacts of the chip carrier package by a suitable process such as brazing, electron beam welding, spot welding or laser welding.

Figure 5:
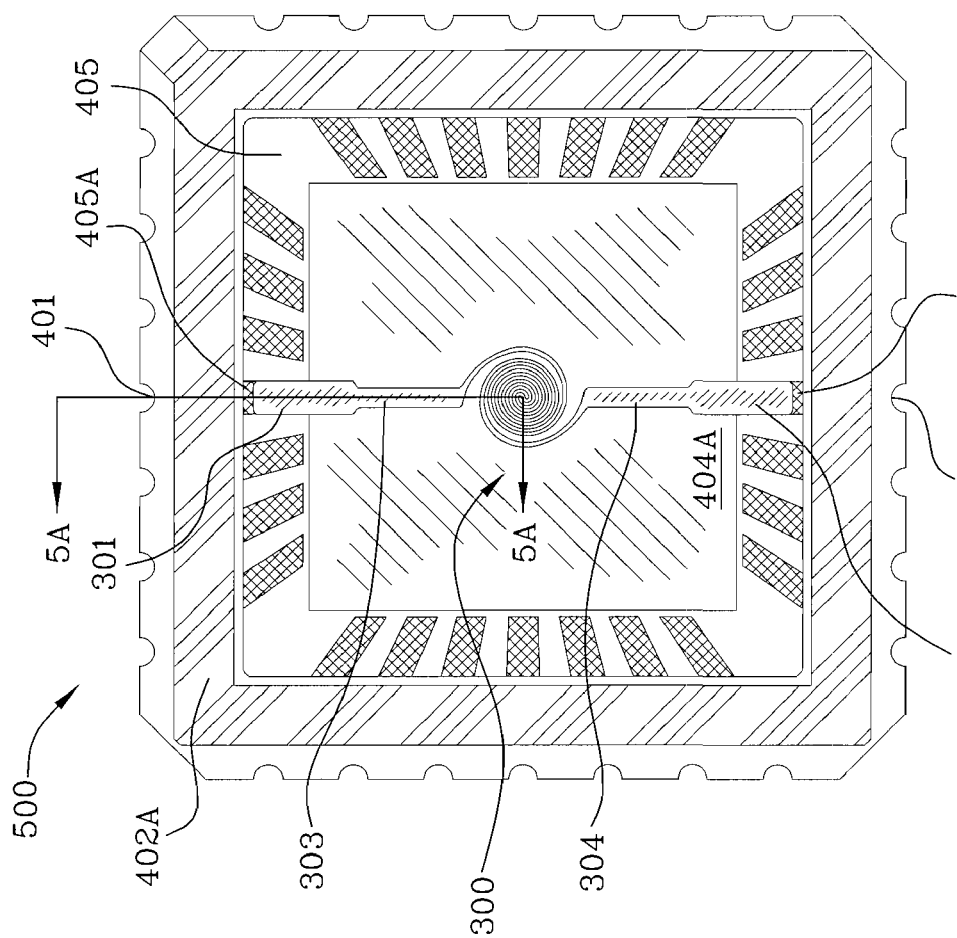
FIG. 5 is a view similar to FIG. 4 with the double-spiral element placed in the ceramic base straddling the ledge with the end contact portions mating with a respective pair of the contact pairs of the ledge.

FIG. 5 is a view 500 similar to FIG. 4 with the double-spiral filament 300 placed in the ceramic base or housing 400 straddling the ledge 405 with the end contact portions 301, 302 mating with a respective pair 405A, 406 of the contact pairs of the ledge 405.

Figure 5A:
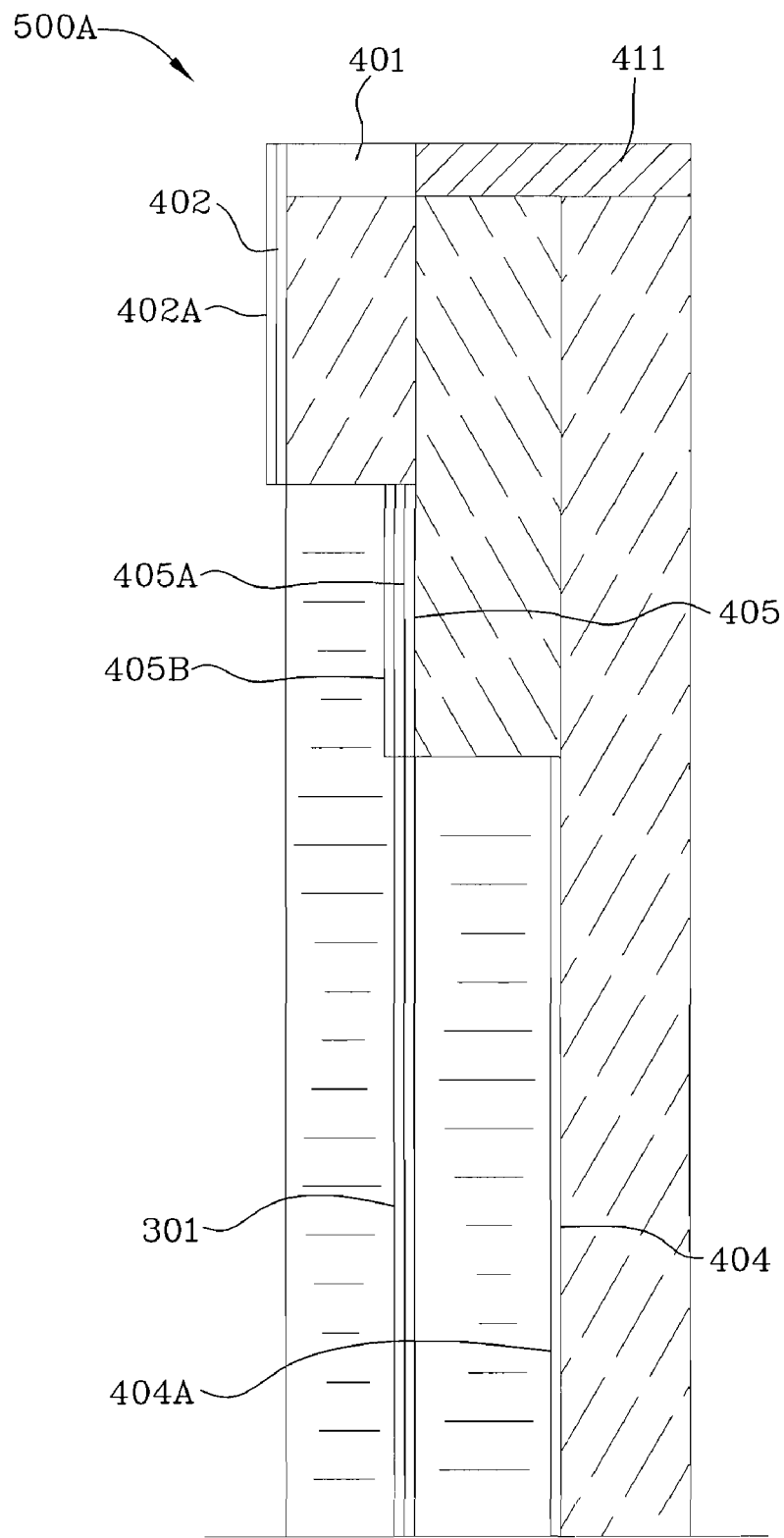
FIG. 5A is a quarter sectional view of FIG. 5.

FIG. 5A is a quarter sectional view 500A of FIG. 5 illustrating the braze preform securing the end contact portion 301 to contact 405A on ledge 405 of housing 400. End contact portion 301 is fused to the contact 405A upon sufficient heating and subsequent cooling.

FIG. 6 is a view 600 of the bottom side of the lid 601 illustrating the transparent window 602 and the lip 603A which mates with and is secured to the upper surface 402A of the ceramic base. The lid is commercially available from Spectrum Semiconductor Materials of San Jose, Calif. part no. C-731-21-50MK100MND-GKL. The material of the lid is Kovar and includes the gold plating on top of nickel with a 80% Au/20% Sn solder preform. FIG. 6A is a side view 600A of the lid 601 illustrating the lip 603A with solder preform 603 applied over the lip. At least one notch, nick or groove 608 is cut into the solder preform 603 such that when it is secured or held into sealing engagement with gold plated surface 402A and placed in a furnace under vacuum conditions the contents of the ceramic housing 400 and the lid 601 are evacuated. Alternatively, the ceramic housing and lid may be placed in an environment of halogen gas. FIG. 6B is an enlarged portion of FIG. 6A illustrating nick 608 in more detail. The heat of the furnace remelts and reflows the solder preform eliminating the nick and securing the lid and the chip carrier package together.

FIG. 7 is a top view 700 of the ultraminiature light source assembled.

Figure 8:
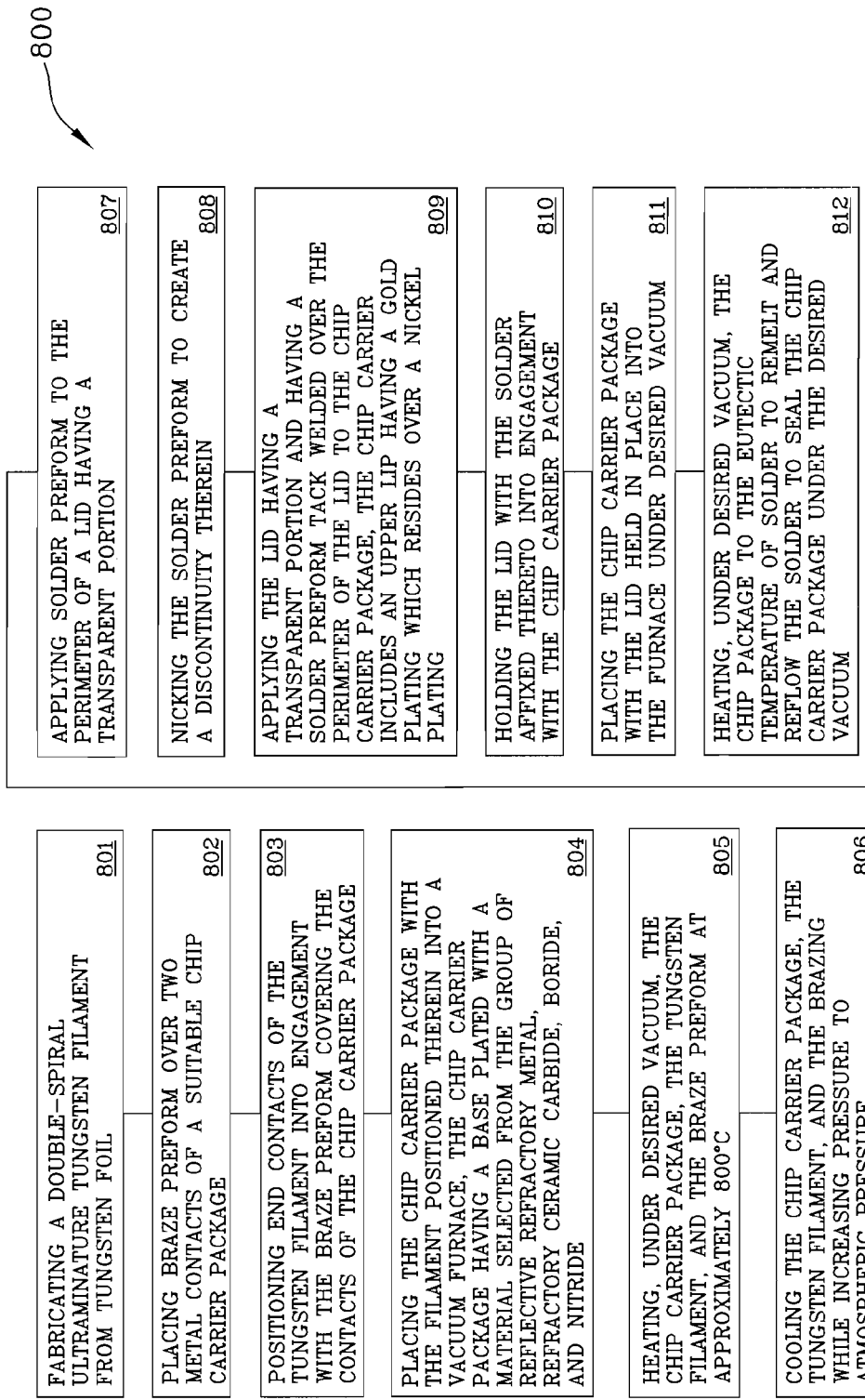
FIG. 8 is a schematic of the steps to manufacture the ultraminiature light source.

FIG. 8 is a schematic 800 of the steps to manufacture the ultraminiature light source. The steps include fabricating a double-spiral ultraminiature tungsten filament from tungsten foil-801; placing braze preform over two metal contacts of a suitable chip carrier package-802; positioning end contacts of the tungsten filament into engagement with the braze preform covering the contacts of the chip carrier package-803; placing the chip carrier package with the filament positioned therein into a vacuum furnace, the chip carrier package having a base plated with a material selected from the group of reflective refractory metal, refractory ceramic carbide, boride, and nitride-804; heating, under desired vacuum, the chip carrier package, the tungsten filament, and the braze preform 805 at approximately 800° C. to melt the braze preform and bond the filament to the chip package; cooling the chip carrier package, the tungsten filament, and the brazing while increasing pressure to atmospheric pressure-806; applying solder preform to the perimeter of a lid having a transparent portion-807; nicking the solder preform to create a discontinuity therein-808; applying the lid having a transparent portion and having a solder preform tack welded over the perimeter of the lid to the chip carrier package, the chip carrier includes an upper lip having a gold plating which resides over a nickel plating; holding the lid with the solder affixed thereto into engagement with the chip carrier package-810; placing the chip carrier package with the lid held in place into the furnace under desired vacuum-811; heating, under desired vacuum, the chip package to the eutectic temperature of solder to remelt and reflow the solder to seal the chip carrier package under the desired vacuum to create an air tight seal between the package and the lid-812; and, cooling to room temperature and restoring atmospheric pressure within the furnace-813.

Alternatively, the step of placing braze preform on the contacts may be substituted with any suitable process of bonding the contacts to the chip carrier by brazing, electron beam welding, spot welding or laser welding.

The eutectic point referred to in the step denoted by reference numeral 812 is the point at which the liquid phase borders directly on the solid phase. The temperature that corresponds to this point is known as the eutectic temperature.

The step of applying solder preform to the perimeter of a lid having a transparent portion-807—includes the solder preform being tack welded to the window lid. The attachment of the solder preform to the lid prior to the sealing process avoids potential handling damage to the delicate 0.510 mm (510 µm) thick gold preform and reduces alignment offsets of the gold preform to the sealing surfaces.

The ceramic housing has a metallized upper lip consisting of a base coating of nickel plating with a top coating of 0.0015 mm (1.5 µm) of gold plating.

The light source disclosed herein was successfully tested at 3.125 VDC at 0.40 A yielding approximately 1.250 W at 2200° K. for approximately 1000 hours. Different filament materials operating at different voltages will produces different values.

Figure 9:
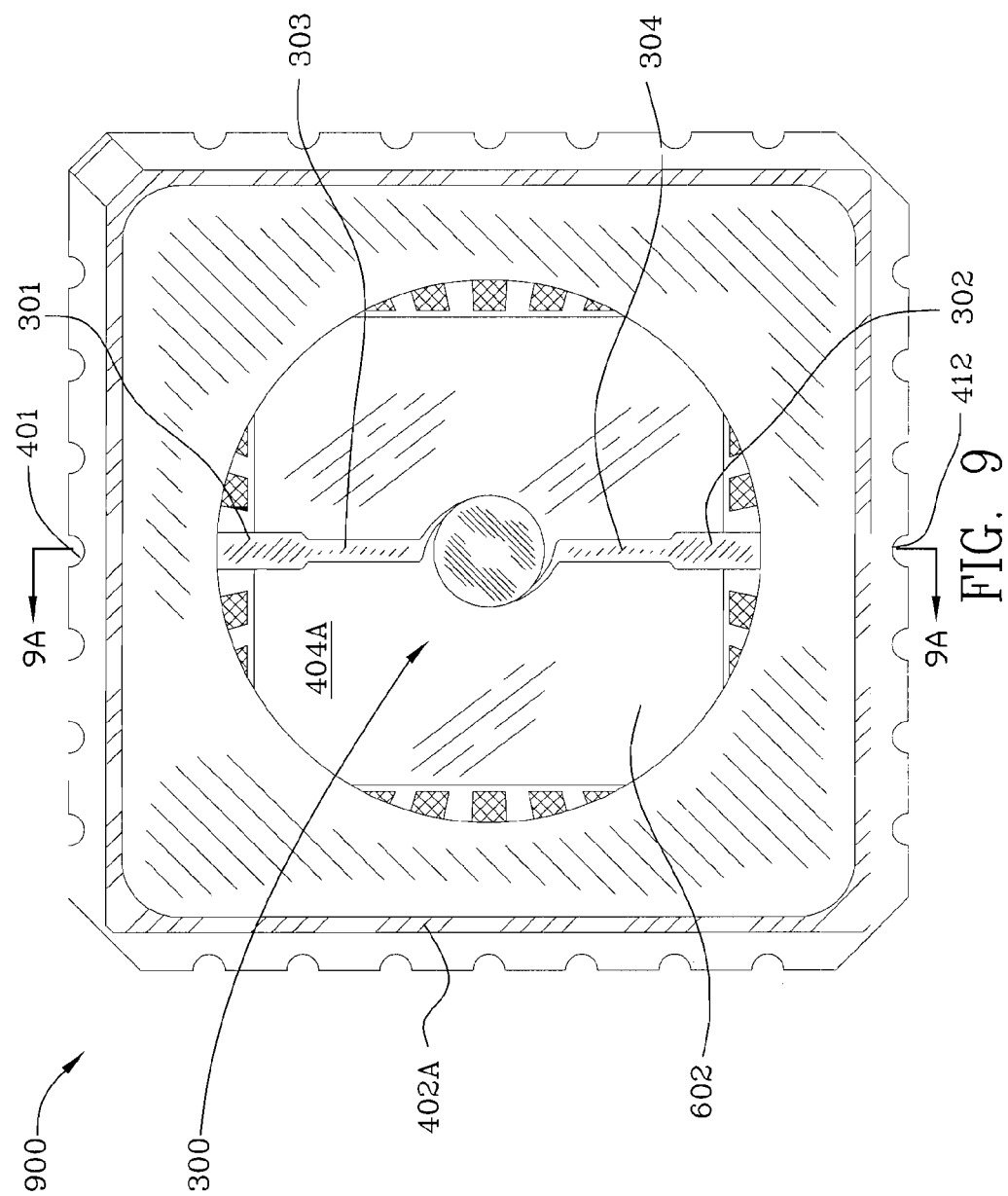
FIG. 9 is a top view of the ultraminiature light source with a fiber optic guide secured to the transparent window with optical adhesive.

FIG. 9 is a top view 900 of the ultraminiature light source with a fiber optic guide 901 secured to the transparent window 602 with optical adhesive 902.

Figure 9A:
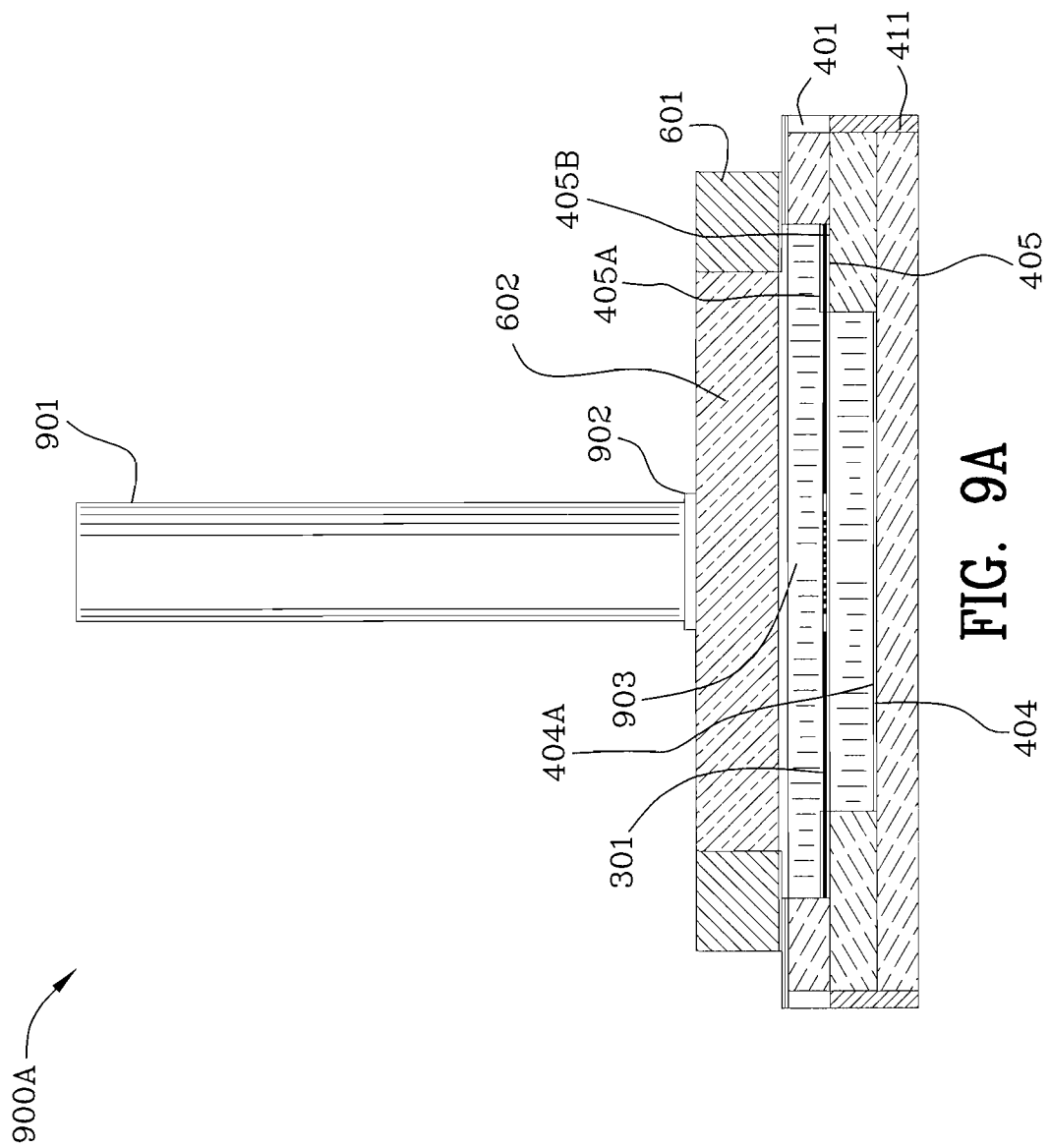
FIG. 9A is an enlarged cross-sectional view taken along the lines 9A-9A of FIG. 9.

FIG. 9A is an enlarged cross-sectional view 900A taken along the lines 9A-9A of FIG. 9. A gap 903 of approximately 0.58 mm (580 µm) is illustrated in FIG. 9A between the filament and the window 602.

The advantage of the tungsten light source disclosed herein includes the fact that it provides a broad optical spectrum. This broad spectrum is accompanied by a short coherence length. It is key, therefore, to couple the light source into an optical fiber in an efficient manner. This becomes increasingly problematic when the core size of the optical fiber is small. Fibers used in optical fiber sensors may be 50 microns or smaller. Such fibers usually have a small numerical aperture number (NA) such as 0.22. This means that either the light entering the fiber must be fairly collimated or that the fiber must be close to the source if the light is not highly collimated. The tungsten light source disclosed herein radiates light in all directions although the dual spiral coils tend to concentrate the light source. In order to maximize coupling a small filament light source with dimensions approaching that of the fiber, close spacing of the fiber to the filament is required to achieve any sort of efficiency in getting the tungsten light spectrum into the fiber.

Figure 10:
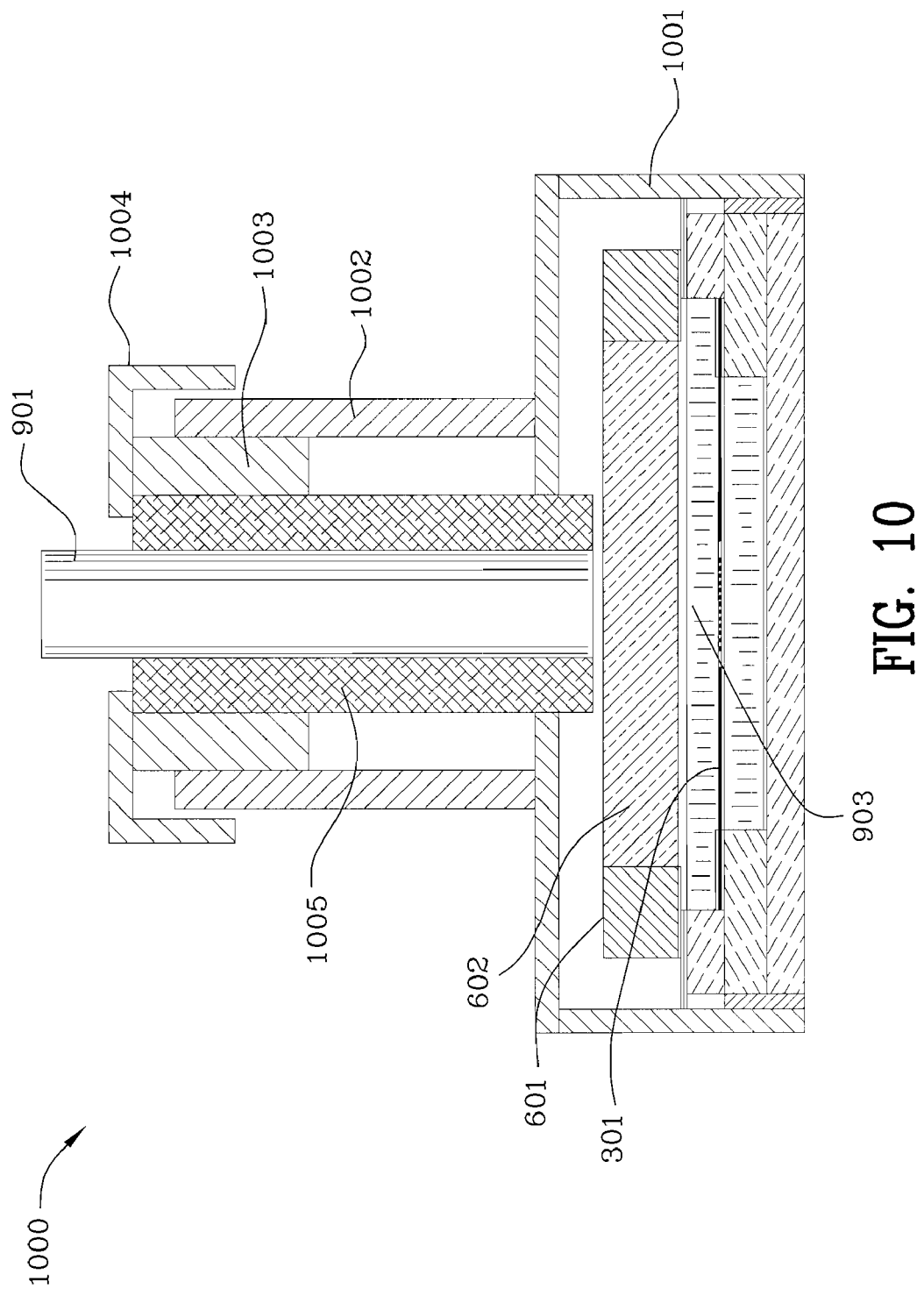
FIG. 10 is an enlarged cross-sectional view similar to FIG. 9A illustrating another fiber optical guide coupling arrangement.

FIG. 10 is an enlarged cross-sectional view 1000 similar to FIG. 9A illustrating another fiber optic guide coupling arrangement. Connector housing 1001 fits over the packaged tungsten filament light source and the connector female receptacle 1002 is in engagement with the package. Male connector 1003 is insertable within the female connector 1002. Male connector 1003 includes a housing portion 1004 and a resilient portion 1005 for receiving the fiber 901. The fiber 901 is positioned in proximity to the window for good coupling to the tungsten filament. Resilient material 1005 is used to grip the fiber optic guide 901 and enables the replacement of the optic fiber 901 if necessary.

Figure 11:
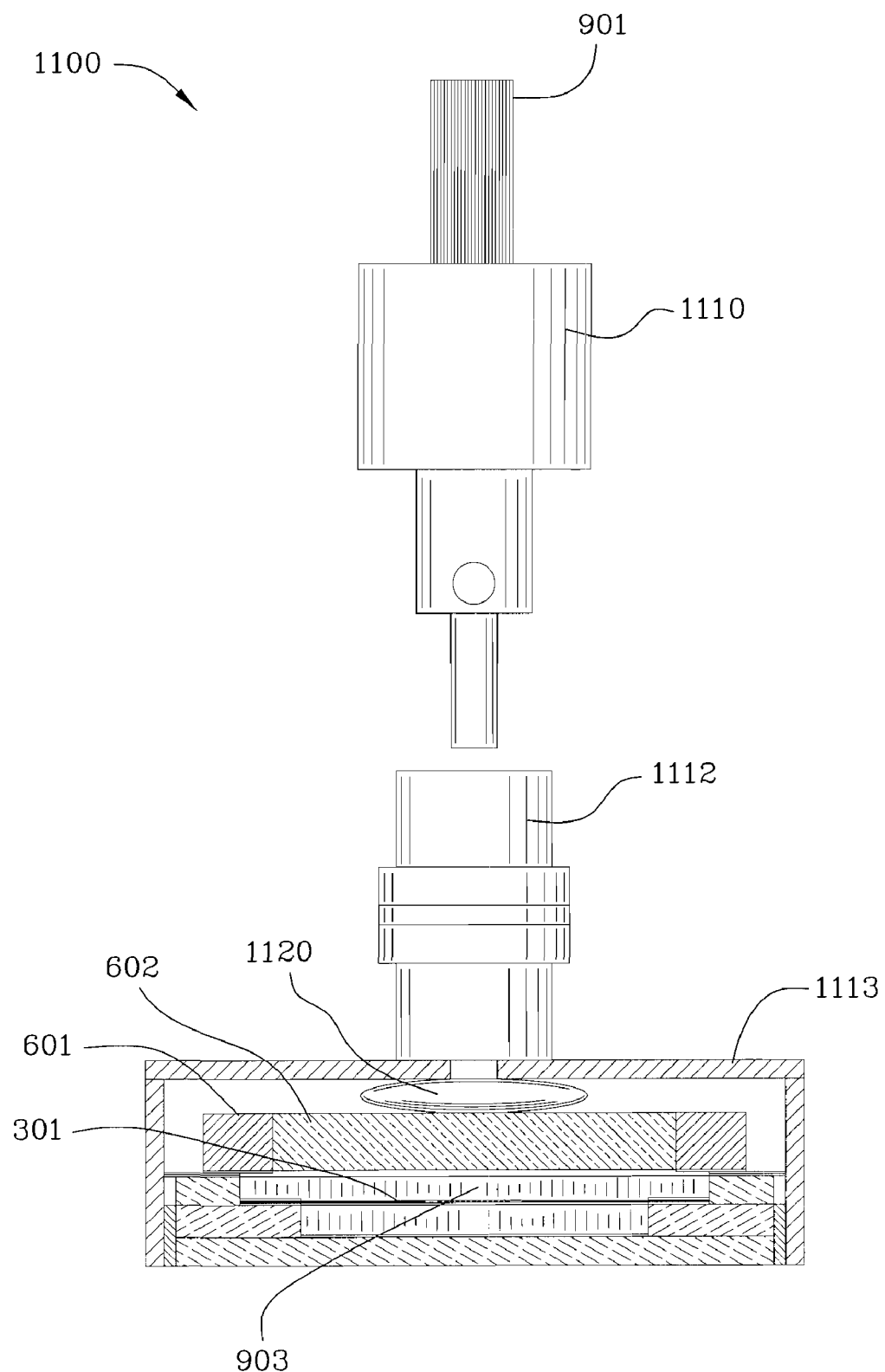
FIG. 11 is an enlarged cross-sectional view of another connector arrangement.
Figure 11A:
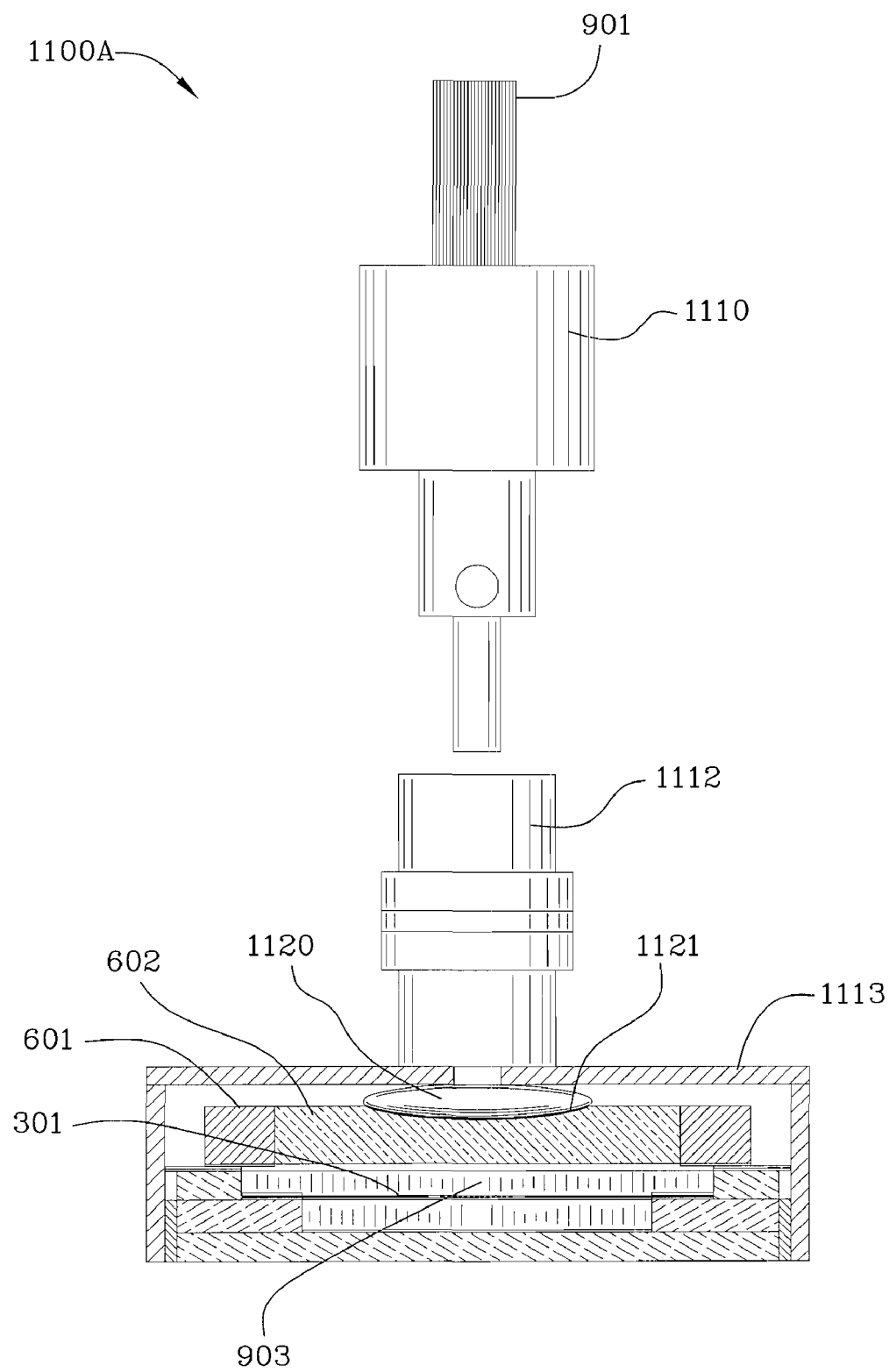
FIG. 11A is an enlarged cross-sectional view of another connector similar to FIG. 11 with a lens integral with the lamp package window.
Figure 11B:
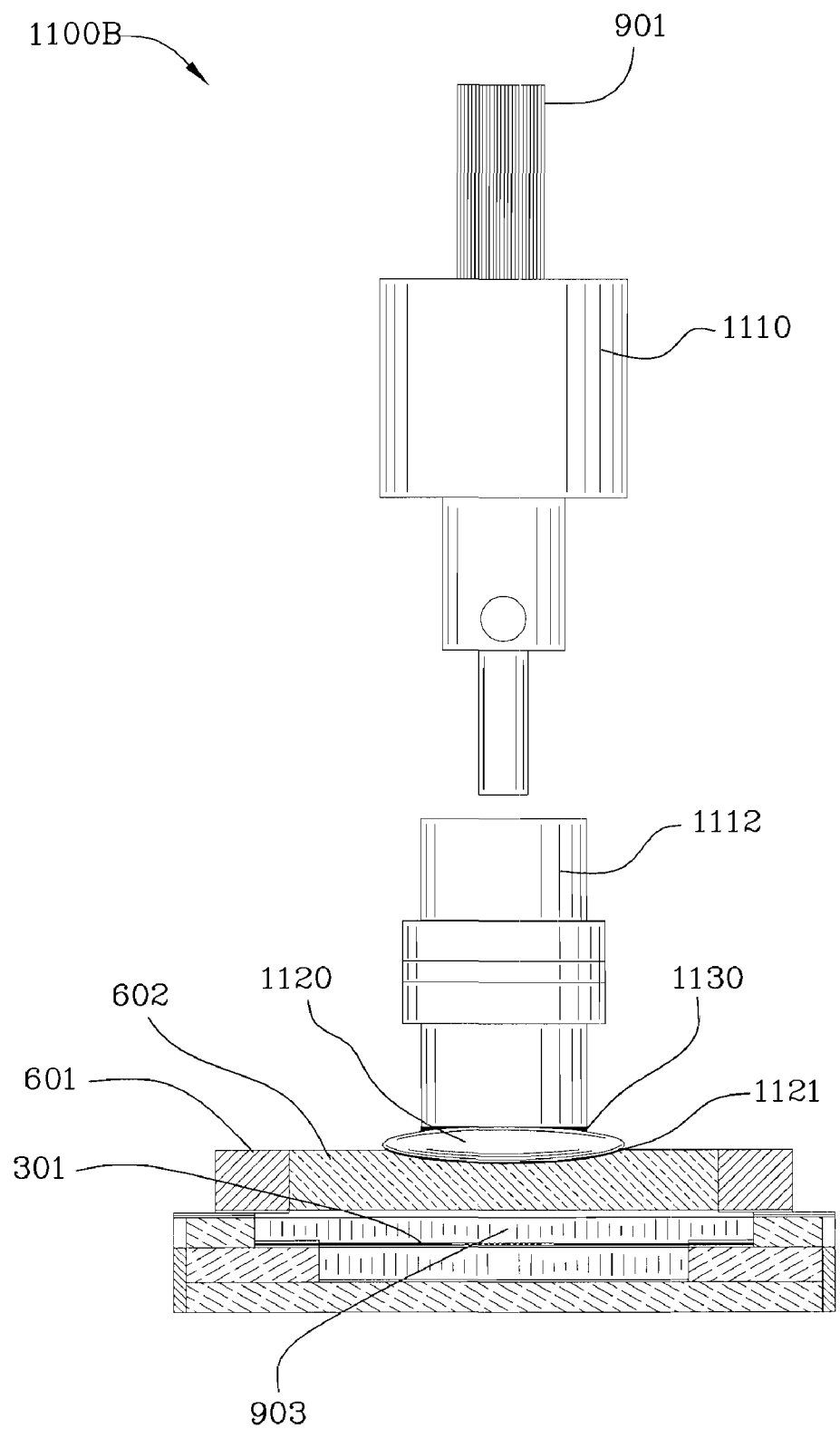
FIG. 11B is an enlarged cross-sectional view of a connector similar to FIG. 11A with the connector directly engaging and attached to the lens with adhesive, solder, braze, glass frit or welded to the package lid.

FIG. 11 is an enlarged cross-sectional view 1100 of another connector arrangement wherein the fiber is held in a male connector 1110, which in turn is coupled to a female connector receptacle 1112 affixed to a lamp package mount 1113. Optionally a lens 1120 may be used. FIG. 11A is an enlarged cross-sectional view 1100A of another connector similar to FIG. 11 with a lens integrally affixed 1121 with the lamp package window. FIG. 11B is an enlarged cross-sectional view 100B of a connector similar to FIG. 11A with the connector directly engaging and attached to the lens by adhesive, solder, braze, or glass frit 1130. Alternatively the lens 1120 may be welded to the package lid.

1100-cross-sectional view of a coupling arrangement with an optional lens 1100A-cross-sectional view of a coupling arrangement with a lens integral with the transparent window

LIST OF REFERENCE NUMERALS

100—schematic of related art device in U.S. Pat. No. 6,796,866.
102—top silicon substrate
104—transparent window in top silicon substrate
106—middle silicon substrate for mounting filament 200
108—bottom silicon substrate
200—filament
202—silicon substrate
212—silicon substrate
204—top nitride layer of top substrate
206—bottom nitride layer of top substrate
210—wire bond pad 214—top nitride layer of middle filament mounting substrate 106
216—bottom nitride layer of middle filament mounting substrate
218—aperture in bottom substrate
220—end contacts of the spiral filament
222—electrical leads
230—bonding ring
232—bonding ring
234—insulation
236—electrical leads
240—wire bond lead
242—reflective top layer of bottom silicon substrate 108
250—bonding ring
252—bonding ring
260—gap
261—gap
262—gap
263—gap
260A—contact area after heating
261A—contact area after heating
262A—contact area after heating
263A—contact area after heating
291—intermediate portion
292—central portion
300—double-spiral filament
300A—double-spiral filament with dimensions includes
300B—enlarged filament portion of FIG. 3
300C—perspective view of filament
301—end contact portion which sits on ledge of leadless chip carrier package
302—end contact portion which sits on ledge of leadless chip carrier package
303—transitional portion interconnecting end contact portion 301 and outer spiral portion 306 of the first spiral
304—transitional portion interconnecting end contact portion 302 and outer spiral portion 305 of the second spiral
305—second spiral
305A—beginning of outer-most winding 307 the second spiral 305
306—first spiral
306A—beginning of outer-most winding 308 of the first spiral
307—outer-most winding of the second spiral
308—outer-most winding of the first spiral
309—intermediate winding of the second spiral
310—intermediate winding of the first spiral
311—intermediate winding of the second spiral
312—intermediate winding of the first spiral
313—central portion joining first and second spirals
314—gap between beginning portion of first spiral and second spiral
315—gap between beginning portion of first spiral and second spiral where they begin to converge
316—gap between beginning portion of second spiral and first spiral
316A—gap between beginning portion of second spiral and first spiral where they begin to converge
317—gap between intermediate portions of first and second spirals
320—gap between intermediate portions of second and first spirals
323—termination of gap between intermediate portions of first and second spirals
324—termination of gap between intermediate portions of second and first spirals
340—arrow to beginning of gap between second spiral 305 and first spiral 306
341—arrow to beginning of gap between first spiral 306 and second spiral 305
350—overall length of approximately 8.00 mm of the filament of the example illustrated
351—approximate length of 4.84 mm between transition portions 303, 340 of the example illustrated
352—outer diameter of approximately 1.50 mm of the filament of the example illustrated
353—diameter of filament after approximately 180° arc of the example illustrated
354—approximate width of 0.500 mm of the contact portions 302, 301 of the example illustrated
355—approximate radii of 0.89 mm of the first and second spirals at the beginning of the spirals of the example of the example illustrated
356—approximate radii of 0.68 mm of the first and second spirals after an approximate 90° arc of the example illustrated
357—approximate radii of 0.58 mm of the first and second spirals after an approximate 180° arc of the example illustrated
358—approximate distance of 4.84 mm between the contact portion of the example illustrated
359—length of end contact portion
388—thickness of the filament
400—top plan view of a leadless chip carrier
400A—quarter-sectional view of the leadless chip carrier illustrated in FIG. 4 taken along the lines 4A-4A
400B—quarter-sectional view of the leadless chip carrier illustrated in FIG. 4 further illustrating the braze preform and the reflective bottom
401—side indentation of leadless chip carrier
402—upper surface or perimeter of the leadless chip carrier
402A—nickel plating
402B—gold plating
404—bottom of leadless chip carrier package
404A—reflective material on the bottom of the chip carrier package
405—ledge
405A—contact
405B—braze preform, electron welding, spot welding, laser welding
406—contact
407—contact
408—contact
409—exterior contact
410—exterior contact
411—exterior contact
412—side indentation of leadless chip carrier package
500—top plan view of a leadless chip carrier similar to view of FIG. 4 with the filament placed therein
500A—quarter-sectional view taken along the lines 5A-5A of FIG. 5
501—braze preform
600—bottom view of the lid 601
600A—side view of the lid 601
600B—enlarged portion of FIG. 6A
601—lid
602—transparent window
603—solder preform on bottom facing lip
603A—lip
604—bottom side of top cover of the lip
608—nick in the solder preform 603
609—top cover of lid 601
700—completed assembly of the light source with the lid 800—schematic of process to manufacture the light source
801—fabricating a double-spiral ultraminiature tungsten filament from tungsten foil
802—placing braze preform over two metal contacts of a suitable chip carrier package or electron welding, spot welding or laser welding
803—positioning end contacts of the tungsten filament into engagement with the braze preform covering the contacts of the chip carrier package
804—placing the chip carrier package with the filament positioned therein into a vacuum furnace, the chip carrier package having a base plated with a material selected from the group of reflective refractory metal, refractory ceramic carbide, boride, and nitride
805—heating, under desired vacuum, the chip carrier package, the tungsten filament, and the braze preform at approximately 800° C.
806—cooling the chip carrier package, the tungsten filament, and the brazing while increasing pressure to atmospheric pressure
807—applying solder preform to the perimeter of a lid having a transparent portion
808—nicking the solder preform to create a discontinuity therein
809—applying the lid having a transparent portion and having a solder preform tack welded over the perimeter of the lid to the chip carrier package, the chip carrier includes an upper lip having a gold plating which resides over a nickel plating
810—holding the lid with the solder affixed thereto into engagement with the chip carrier package
811—placing the chip carrier package with the lid held in place into the furnace under desired vacuum
812—heating, under desired vacuum, the chip package to the eutectic temperature of solder to remelt and reflow the solder to seal the chip carrier package under the desired vacuum
813—cooling to room temperature and restoring atmospheric pressure within the furnace
900—top view of filament within the assembled package coupled to a fiber optic guide
900A—cross-sectional view taken along the lines 9A-9A
901—fiber optic guide
902—optical adhesive
903—gap between window 602 and filament
1000—cross-sectional view of a connector for coupling a fiber optic guide to the assembled package
1001—connector housing
1002—connector female receptacle
1003—male connector
1004—housing of the male connector
1005—resilient material gripping the fiber optic guide 901
1100—cross-sectional view of a coupling arrangement with an optional lens
1100A—cross-sectional view of a coupling arrangement with a lens integral with the transparent window
1100B—cross-sectional view of a connector affixed directly to a lens
1110—male connector
1112—female connector
1113—package coupling mount
1120—lens
1121—lens embedded in window 602
1130—adhesive, solder, braze, glass frit or ultrasonic weld Those skilled in the art will readily recognize that the invention has been set forth by way of examples only and that many changes may be made to the structure of the examples and to the process set forth by way of examples without departing from the spirit and scope of the claims attached hereto.

The invention claimed is:

1. A light source comprising: a ceramic base; a generally planar double-spiral shaped filament suspended within said ceramic base; said double-spiral shaped filament material is selected from the group consisting of tungsten, an alloy of tungsten and other incandescent filament material; a transparent lid; said ceramic base includes a reflective bottom, a ledge, and a raised perimeter having a metallic surface; said ledge includes metallic surfaces embedded therein for electrical communication with said double-spiral shaped filament; said double-spiral shaped filament comprises first and second interleaved concentric spiral portions radially converging with decreasing radius and centrally joined together in a central portion; each of said first and second spiral portions of said double-spiral shaped filament includes an end contact portion, a transition portion, an arc shaped portion, an intermediate portion and a central portion, said end contact portion having a large width, said transition portion interconnected to said end contact portion and having a transition width smaller than said end contact portion, said intermediate portion having an intermediate width, said arc-shaped portion having a width initially approximately equal to said width of said transition portion and then gradually tapering to said intermediate width of said intermediate portion, and, each of said intermediate portions terminating and centrally joined together in said central portion; a first gap defined between said first and second spiral portions of said double-spiral shaped filament and a second gap defined between said second and first spiral portions of said double-spiral shaped filament; said first spiral portion being wound in a first direction and said second spiral portion being wound in said first direction; said first and second gaps being substantially constant between said intermediate portions of said spiral portions; said first gap between said transition portion of said first spiral portion and said second spiral portion being relatively larger than said first gap between said intermediate portions of said first and second spiral portions; said second gap between said transition portion of said second spiral and said first spiral portion being relatively larger than said second gap between said intermediate portions of said second and first spiral portions; said first and second gaps near and at said central portion being relatively smaller than said gaps between said intermediate portions of said spiral portions of said double-spiral shaped filament; said end contacts of said first and second spiral portions being bonded to said metal surfaces of said ledge of said ceramic base such that said double-spiral shaped filament is suspended above said reflective base; said transparent lid being soldered to said metal surfaces of said ceramic base forming a sealed chamber within which said double-spiral shaped filament resides and is suspended therein; and, said chamber being at a desired vacuum.

2. A light source as claimed in claim 1 wherein said end contacts of said first and second spiral portions are brazed, electron welded or spot welded to said metal surfaces of said ledge of said ceramic base such that said double-spiral shaped filament is suspended above said reflective base.

3. A light source as claimed in claim 1 wherein said ceramic base is selected from the group consisting of glasses and glass ceramics.

4. A light source as claimed in claim 1 wherein said chamber is filled with halogen or an inert gas.

5. A light source as claimed in claim 1 wherein said reflective bottom of said ceramic base is a metallic surface to provide high reflectance.

6. A light source as claimed in claim 1 wherein said first and second spiral portions have a relatively large radius of curvature in proximity to said end contact portions and wherein said first and second gaps between said first and second spiral portions are relatively large in proximity to said end contact portions.

7. A light source as claimed in claim 6 wherein each of said end contact portions of said first and second spiral portions include a transitional portion, a supporting portion, and an electrical connection portion.

8. A light source as claimed in claim 1 wherein: said end contact portions of said first and second spiral portions of said double-spiral shaped filament each include a transitional portion, a supporting portion and an electrical connection portion; said transitional portions of each of said end contacts of said first and second spiral portions of said double-spiral shaped filament have a relatively large radius of curvature; and, said first and second gaps between said transitional portions of said end contact portions of said first and second spiral portions and the respective intermediate portions of said double-spiral shaped filament are relatively large.

9. A light source as claimed in claim 1 wherein the size of said first gap between said end contact portion of said first spiral portion and said second spiral portion being relatively larger than said first gap between said intermediate portions of said first and second spiral portions and the size of said second gap between said end contact portion of said second spiral and said first spiral portion being relatively larger than said second gap between said intermediate portions of said second and first spiral portions, said sizes of said first and second gaps are determined by the amount the filament expands due to thermal effects during operation.

10. A light source as claimed in claim 1 wherein the diameter of the intermediate portions of the double-spiral shaped filament is approximately 1.15 mm (1,150 µm).

11. A light source as claimed in claim 1 wherein the double-spiral shaped filament is less than 100 µm wide.

12. A light source as claimed in claim 1 wherein said reflective base is gold plated.

13. A light source as claimed in claim 1 wherein said reflective base is selected from the group consisting of a reflective refractory metal, a refractory ceramic carbide, a boride, and a nitride.

14. A light source as claimed in claim 1 comprising: said double spiral shaped tungsten filament having a substantially constant thickness; a carrier package having a transparent window; said double spiral shaped tungsten filament being suspended within said package; a fiber optic guide; and, said fiber optic guide being affixed to said transparent window of said package.

15. A light source as claimed in claim 14 wherein said window of said package is spaced apart from said filament approximately 0.58 mm (580 µm).

16. A light source as claimed in claim 14 wherein said guide is affixed to said transparent window by using one or more of the following selected from the group of optical adhesive, ultrasonic welding, solder, braze, and glass frit.

17. A light source as claimed in claim 14 wherein said guide is affixed in proximity to said window using a coupling affixed to said package.

18. A light source as claimed in claim 17 wherein said coupling includes male and female coupling halves.

19. A light source as claimed in claim 17 further comprising a lens residing between said window and said optic fiber.

20. A process for making an ultraminiature light source, said ultraminiature light source comprises: a ceramic base; a generally planar double-spiral shaped filament suspended within said ceramic base; said double-spiral shaped filament material is selected from the group consisting of tungsten, an alloy of tungsten and other incandescent filament material; a transparent lid; said ceramic base includes a reflective bottom, a ledge, and a raised perimeter having a metallic surface; said ledge includes metallic surfaces embedded therein for electrical communication with said double-spiral shaped filament; said double-spiral shaped filament comprises first and second interleaved concentric spiral portions radially converging with decreasing radius and centrally joined together in a central portion; each of said first and second spiral portions of said double-spiral shaped filament includes an end contact portion, a transition portion, an arc shaped portion, an intermediate portion and a central portion, said end contact portion having a large width, said transition portion interconnected to said end contact portion and having a transition width smaller than said end contact portion, said intermediate portion having an intermediate width, said arc-shaped portion having a width initially approximately equal to said width of said transition portion and then gradually tapering to said intermediate width of said intermediate portion, and, each of said intermediate portions terminating and centrally joined together in said central portion; a first gap defined between said first and second spiral portions of said double-spiral shaped filament and a second gap defined between said second and first spiral portions of said double-spiral shaped filament; said first spiral portion being wound in a first direction and said second spiral portion being wound in said first direction; said first and second gaps being substantially constant between said intermediate portions of said spiral portions; said first gap between said transition portion of said first spiral portion and said second spiral portion being relatively larger than said first gap between said intermediate portions of said first and second spiral portions; said second gap between said transition portion of said second spiral and said first spiral portion being relatively larger than said second gap between said intermediate portions of said second and first spiral portions; said first and second gaps near and at said central portion being relatively smaller than said gaps between said intermediate portions of said spiral portions of said double-spiral shaped filament; said end contacts of said first and second spiral portions being bonded to said metal surfaces of said ledge of said ceramic base such that said double-spiral shaped filament is suspended above said reflective base; said transparent lid being soldered to said metal surfaces of said ceramic base forming a sealed chamber within which said double-spiral shaped filament resides and is suspended therein; and, said chamber being at a desired vacuum, comprising the steps of:

fabricating a double-spiral ultraminiature tungsten filament from tungsten foil;

placing braze preform over two metal contacts of a suitable chip carrier package;

positioning end contacts of said tungsten filament into engagement with said braze preform covering said contacts of said chip carrier package;

placing said chip carrier package with said filament positioned therein into a vacuum furnace, said chip carrier package having a base plated with a material selected from the group of reflective refractory metal, refractory ceramic carbide, boride, and nitride;

heating, under desired vacuum, said chip carrier package, said tungsten filament, and said braze preform to approximately 800° C.;

cooling said chip carrier package, said tungsten filament, and said brazing and increasing pressure to atmospheric pressure;

applying solder preform to the perimeter of a lid having a transparent portion;

nicking said solder preform to create a discontinuity therein;

applying said lid having a transparent portion and having a solder preform tack welded over said perimeter of said lid to said chip carrier package, said chip carrier package includes an upper lip having a gold plating which resides over a nickel plating; holding said lid with said solder affixed thereto into engagement with said chip carrier package;

placing said chip carrier package with said lid held in place into said furnace under desired vacuum;

heating, under desired vacuum, said chip package to the eutectic temperature of solder to remelt and reflow said solder to seal said chip carrier package under said desired vacuum; and, cooling to room temperature and restoring atmospheric pressure within said furnace.

21. A process for making an ultraminiature light source as claimed in claim 20 further comprising the steps of:
applying electrical power to said tungsten filament before applying said lid to said chip carrier package.

22. A process for making an ultraminiature light source as claimed in claim 20 wherein said state of heating, under desired vacuum, said chip carrier package, said tungsten filament, and said braze preform to approximately 800° C. is continued until the braze melts and/or wets said end contacts of said tungsten filament.

23. A process for making an ultraminiature light source, said ultraminiature light source comprises:
a ceramic base; a generally planar double-spiral shaped filament suspended within said ceramic base; said double-spiral shaped filament material is selected from the group consisting of tungsten, an alloy of tungsten and other incandescent filament material; a transparent lid; said ceramic base includes a reflective bottom, a ledge, and a raised perimeter having a metallic surface; said ledge includes metallic surfaces embedded therein for electrical communication with said double-spiral shaped filament; said double-spiral shaped filament comprises first and second interleaved concentric spiral portions radially converging with decreasing radius and centrally joined together in a central portion; each of said first and second spiral portions of said double-spiral shaped filament includes an end contact portion, a transition portion, an arc shaped portion, an intermediate portion and a central portion, said end contact portion having a large width, said transition portion interconnected to said end contact portion and having a transition width smaller than said end contact portion, said intermediate portion having an intermediate width, said arc-shaped portion having a width initially approximately equal to said width of said transition portion and then gradually tapering to said intermediate width of said intermediate portion, and, each of said intermediate portions terminating and centrally joined together in said central portion; a first gap defined between said first and second spiral portions of said double-spiral shaped filament and a second gap defined between said second and first spiral portions of said double-spiral shaped filament; said first spiral portion being wound in a first direction and said second spiral portion being wound in said first direction; said first and second gaps being substantially constant between said intermediate portions of said spiral portions; said first gap between said end contact transition portion of said first spiral portion and said second spiral portion being relatively larger than said first gap between said intermediate portions of said first and second spiral portions; said second gap between said end contact transition portion of said second spiral and said first spiral portion being relatively larger than said second gap between said intermediate portions of said second and first spiral portions; said first and second gaps near and at said central portion being relatively smaller than said gaps between said intermediate portions of said spiral portions of said double-spiral shaped filament; said end contacts of said first and second spiral portions being bonded to said metal surfaces of said ledge of said ceramic base such that said double-spiral shaped filament is suspended above said reflective base; said transparent lid being soldered to said metal surfaces of said ceramic base forming a sealed chamber within which said double-spiral shaped filament resides and is suspended therein; and, said chamber being at a desired vacuum, comprising the steps of:
fabricating a generally planar double-spiral ultraminiature tungsten filament from tungsten foil;
bonding end contacts of said tungsten filament to said chip carrier package by a suitable process selected from the group of brazing, electron beam welding, spot welding and laser welding;
evacuating a furnace to a desired vacuum and placing a lid having a window and said tungsten filament bonded to said chip carrier package therein to remove surface contaminants and water;
aligning and joining said lid having a window to said chip carrier package.

24. A process for making an ultraminiature light source as claimed in claim 23 wherein said step of aligning and joining said lid to said chip carrier includes sealing by a suitable process selected from the group of soldering, brazing, electron beam welding and laser welding.

25. A process for making an ultraminiature light source, said ultraminiature light source comprises:
a ceramic base; a generally planar double-spiral shaped filament suspended within said ceramic base; said double-spiral shaped filament material is selected from the group consisting of tungsten, an alloy of tungsten and other incandescent filament material; a transparent lid; said ceramic base includes a reflective bottom, a ledge, and a raised perimeter having a metallic surface; said ledge includes metallic surfaces embedded therein for electrical communication with said double-spiral shaped filament; said double-spiral shaped filament comprises first and second interleaved concentric spiral portions radially converging with decreasing radius and centrally joined together in a central portion; each of said first and second spiral portions of said double-spiral shaped filament includes an end contact portion, a transition portion, an arc shaped portion, an intermediate portion and a central portion, said end contact portion having a large width, said transition portion interconnected to said end contact portion and having a transition width smaller than said end contact portion, said intermediate portion having an intermediate width, said arc-shaped portion having a width initially approximately equal to said width of said transition portion and then gradually tapering to said intermediate width of said intermediate portion, and, each of said intermediate portions terminating and centrally joined together in said central portion; a first gap defined between said first and second spiral portions of said double-spiral shaped filament and a second gap defined between said second and first spiral portions of said double-spiral shaped filament; said first spiral portion being wound in a first direction and said second spiral portion being wound in said first direction; said first and second gaps being substantially constant between said intermediate portions of said spiral portions; said first gap between said end contact transition portion of said first spiral portion and said second spiral portion being relatively larger than said first gap between said intermediate portions of said first and second spiral portions; said second gap between said end contact transition portion of said second spiral and said first spiral portion being relatively larger than said second gap between said intermediate portions of said second and first spiral portions; said first and second gaps near and at said central portion being relatively smaller than said gaps between said intermediate portions of said spiral portions of said double-spiral shaped filament; said end contacts of said first and second spiral portions being bonded to said metal surfaces of said ledge of said ceramic base such that said double-spiral shaped filament is suspended above said reflective base; said transparent lid being soldered to said metal surfaces of said ceramic base forming a sealed chamber within which said double-spiral shaped filament resides and is suspended therein; and, said chamber being at a desired vacuum, comprising the steps of:

fabricating a generally planar double-spiral ultraminiature tungsten filament from tungsten foil;

bonding end contacts of said tungsten filament to said chip carrier package by a suitable process selected from the group of brazing, electron beam welding, spot welding and laser welding;

cleaning said package and said lid using a glow discharge plasma, ion beam, out-gassing and burn-in of said filament; and, aligning and joining said lid having a window to said chip carrier package.

* * * * *